(12) United States Patent
Wen et al.

(10) Patent No.: US 9,760,210 B2
(45) Date of Patent: Sep. 12, 2017

(54) METHOD AND ASSOCIATED METHOD FOR COORDINATE CORRECTION OF TOUCH CONTROL

(71) Applicant: MStar Semiconductor, Inc., Hsinchu Hsien (TW)

(72) Inventors: Chao-Cheng Wen, Zhunan Township (TW); Guo-Kiang Hung, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 592 days.

(21) Appl. No.: 14/066,890

(22) Filed: Oct. 30, 2013

(65) Prior Publication Data

US 2014/0118282 A1 May 1, 2014

(30) Foreign Application Priority Data

Oct. 30, 2012 (TW) .............................. 101140098 A

(51) Int. Cl.
*G06F 3/041* (2006.01)

(52) U.S. Cl.
CPC .................................. *G06F 3/0418* (2013.01)

(58) Field of Classification Search
CPC ...................................................... G06F 3/0418
See application file for complete search history.

(56) References Cited

U.S. PATENT DOCUMENTS

| 6,329,995 B1 * | 12/2001 | Nagashima ............... G06T 1/20 345/173 |
| 2009/0167725 A1 * | 7/2009 | Lee ........................ G06F 3/0418 345/178 |
| 2010/0321328 A1 * | 12/2010 | Chang ................... G06F 3/0416 345/174 |

FOREIGN PATENT DOCUMENTS

TW           201101132 A       1/2011

OTHER PUBLICATIONS

Taiwan Office Action, Jan. 15, 2015, 5 pages.

\* cited by examiner

*Primary Examiner* — William Boddie
*Assistant Examiner* — Andrew Schnirel
(74) *Attorney, Agent, or Firm* — Edell, Shapiro & Finnan, LLC

(57) ABSTRACT

A method for coordinate correction of touch control is provided. An original x-coordinate and an original y-coordinate are corrected according to a total sensing value, the original x-coordinate and the original y-coordinate provided by touch sensing of a touch panel. The method includes providing an estimated x-axis correction value according to the original x-coordinate and the total sensing value, generating a corrected x-coordinate according to the estimated x-axis correction value and the original x-coordinate, and providing a corrected y-coordinate according to the original x-coordinate, the corrected x-coordinate and the total sensing value.

11 Claims, 15 Drawing Sheets

METHOD AND ASSOCIATED METHOD FOR COORDINATE CORRECTION OF TOUCH CONTROL

This application claims the benefit of Taiwan application Serial No. 101140098, filed Oct. 30, 2012, the subject matter of which is incorporated herein by reference.

BACKGROUND OF THE INVENTION

Field of the Invention

The invention relates in general to a method and associated system for coordinate correction of touch control, and more particularly to a method and associated system that corrects an x-coordinate according to a total sensing value of sensing electrodes and an original x-coordinate and accordingly corrects a y-coordinate.

Description of the Related Art

A touch panel, e.g., a capacitive touch panel, offering users with a friendly and intuitive operation interface, is prevalent in various kinds of consumer electronic devices, portable devices and handheld devices, such as remote controllers, portable handsets, digital cameras, video recorders/players, portable pads and touch screens. In a capacitive touch panel, a capacitance change of before and after a user touch is sensed by a plurality of sensing electrodes to accordingly obtain a set of coordinates (including an x-coordinate and a y-coordinate) that represent a position of the user touch on a touch panel. However, due to numerous non-ideal factors such as a fringe effect of sensing electrodes, an error frequently exists between coordinates calculated by a touch panel and real coordinates of a user touch position. An intended touch operation of the user may not be correctly analyzed if the error gets excessive. Therefore, there is a need for a solution for correcting original coordinates preliminarily calculated by a touch panel, so that a difference between corrected coordinates and real coordinates can be minimized.

SUMMARY OF THE INVENTION

According to an object of the present invention, a method for coordinate correction of touch control for a touch panel is provided. The touch panel, through touch sensing, provides an original x-coordinate, an original y-coordinate and a total sensing value, which are utilized for correcting the original x-coordinate and the original y-coordinate. The touch panel may be a self-coupling capacitive touch panel made of a single conductive layer, with all touch sensing electrodes disposed on the same conductive layer. These electrodes comprise a plurality of electrode groups arranged along an x-axis direction from one side of a sensing region to one other side of the sensing region. Each of the sensing electrode groups comprises a plurality of sensing electrodes, each of which extends along a y-axis direction from one side of the sensing region to the other side of the sensing region. The total sensing value represents a self-coupling capacitance change sensed by the sensing electrode groups. For example, the total sensing value may be a sum of self-coupling capacitance changes sensed by the sensing electrode groups.

The method for coordinate correction of touch control comprises: providing an estimated x-axis correction value according to the original x-coordinate and the total sensing value; selectively performing an x-coordinate correction according to a size of the total sensing value and whether the original x-coordinate is located within an x-axis border range to generate a corrected x-coordinate, for correcting the original x-coordinate, according to the original x-coordinate and the estimated x-axis correction value (e.g., a linearity combination of the two); providing an estimated y-axis correction value according to the original x-coordinate, the total sensing value and the corrected x-coordinate, and providing an x-axis correction starting coordinate according to the original x-coordinate and the total sensing value; and selectively performing a y-axis coordinate correction according to whether the corrected x-coordinate is located outside the x-axis correction starting coordinate to provide a corrected y-coordinate, for correcting the original y-coordinate, according to the original y-coordinate and the estimated y-axis correction value (e.g., a linearity combination of the two).

Preferably, an x-axis border inner-edge coordinate and an x-axis border outer-edge coordinate are provided to define the x-axis border range; a lower limit sensing value is provided; an advanced sensing value is provided according to the total sensing value, e.g., a square root of the total sensing value is utilized as the advanced sensing value; and a y-axis compensation boundary is provided. When the original y-coordinate is located outside the y-axis compensation boundary, the advanced sensing value is compensated/updated (or the total sensing value is updated to update the advanced sensing value), e.g., by increasing the advanced sensing value. When the original x-coordinate is between the x-axis border inner-edge coordinate and the x-axis border outer-edge coordinate, and the advanced sensing value is greater than the lower limit sensing value, the x-coordinate correction is performed to provide the x-axis correction starting coordinate according to the original x-coordinate and the advanced sensing value (or the total sensing value); or else the x-coordinate correction is not performed. When the x-coordinate correction is already performed, and the corrected x-coordinate is located outside the x-axis correction starting coordinate, the y-coordinate correction is performed; or else the y-coordinate correction is not performed.

Preferably, when the original x-axis coordinate is between the x-axis border inner-edge coordinate and the x-axis border outer-edge coordinate, and the advanced sensing value is greater than the lower limit sensing value, an estimated gradient and an estimated ripple value may be provided according to the original x-coordinate, the advanced sensing value (or the total sensing value) and the original y-coordinate, and the y-axis correction value may be provided according to the original x-coordinate, the x-axis correction starting coordinate, the estimated gradient and the estimated ripple value.

Preferably, the corrected x-coordinate obtained from the x-coordinate correction is between the x-axis detectable outer-edge coordinate and the x-axis border inner-edge coordinate; the touch panel further comprises a display panel for displaying an image in a display region. Preferably, a region extension is performed to associate the x-axis detectable outer-edge coordinate to the side of the sensing region, and a region scaling step is performed to associate the side of the sensing region to a side of the display region.

Preferably, an x-axis correction table is provided for recording a plurality of x-axis correction values for a plurality of look-up-table (LUT) sensing values and a plurality of LUT x-coordinates. Each of the x-axis correction values is associated with one of the LUT sensing values and one of the LUT x-coordinates.

Preferably, a first LUT x-coordinate and a second LUT x-coordinate are looked up from the LUT x-coordinates, such that the original x-coordinate is between the first LUT x-coordinate and the second LUT x-coordinate. A first LUT sensing value and a second LUT sensing value are looked up from the LUT sensing values, such that the advanced sensing value is between the first LUT sensing value and the second LUT sensing value. A first x-axis correction value, a second x-axis correction value, a third x-axis correction value and a fourth x-axis correction value are provided by the x-axis correction table, such that the first x-axis correction value is associated with the first LUT sensing value and the first LUT x-coordinate, the second x-axis correction value is associated with the first LUT sensing value and the second LUT x-coordinate, the third x-axis correction value is associated with the second LUT sensing value and the first LUT x-coordinate, and the fourth x-axis correction value is associated with the second LUT sensing value and the second LUT x-coordinate. Further, the first x-axis correction value and the second x-axis correction value are interpolated according to the first LUT x-coordinate, the second LUT x-coordinate and the original x-coordinate to obtain a first interpolation x-axis correction value. The third x-axis correction value and the fourth x-axis correction value are also interpolated to obtain a second interpolation x-axis correction value. Next, the first interpolation x-axis correction value and the second interpolation x-axis correction value are interpolated according to the first LUT sensing value, the second LUT sensing value and the advanced sensing value to obtain the estimated x-axis correction value.

Preferably, the LUT sensing values are associated with a plurality of LUT touch control sizes, respectively. When providing the x-axis correction starting coordinate, a first LUT touch control size and a second LUT touch control size, associated with the first LUT sensing value and the second LUT sensing value, respectively, are provided form the LUT touch control sizes. The first LUT touch control size and the second LUT touch control size are interpolated according to the first LUT sensing value, the second LUT sensing value and the advanced sensing value to obtain an estimated touch control size. The x-axis correction starting coordinate is then provided according to the estimated touch control size.

Preferably, the LUT touch control sizes are further associated with a plurality of sets of gradient value curve parameters, respectively. Each set of gradient value curve parameters is associated with a first curve, and each first curve associates the original y-coordinate to a gradient. When providing the estimated gradient, a first set of gradient value curve parameters and a second set of gradient value curve parameters, associated with the first LUT touch control size and the second LUT touch control size, respectively, are selected from the sets of gradient value curve parameters. The original y-coordinate is substituted into the first curve associated with the first set of gradient value curve parameters to obtain a first gradient, and the original y-coordinate is substituted into the first curve associated with the second set of gradient value curve parameters to obtain a second gradient. The first gradient and the second gradient are interpolated according to the first LUT touch control size, the second LUT touch control size and the estimated touch control size to obtain the estimated gradient.

Preferably, the LUT touch control sizes are associated with a plurality of sets of ripple value curve parameters, respectively. Each set of ripple value curve parameters is associated with a second curve, and each second curve associates the original y-coordinate to a ripple value. When providing the estimated ripple value, a first set of ripple value curve parameters and a second set of ripple value curve parameters, associated with the first LUT touch control size and the second LUT touch control size, respectively, are selected from the sets of ripple value curve parameters. The original y-coordinate is substituted into the second curve associated with the first set of ripple value curve parameters to obtain a first ripple value, and the original y-coordinate is substituted into the second curve associated with the second set of ripple value curve parameters to obtain a second ripple value. The first ripple value and the second ripple value are interpolated according to the first LUT touch control size, the second LUT touch control size and the estimated touch control size to obtain the estimated ripple value.

A system for coordinate correction for a touch control panel for correcting an original x-coordinate and an original y-coordinate provided by the touch panel is further provided. The system comprises a configuration module, a sensing value module, an x-axis correction module, a y-axis correction module, a first estimation module, a second estimation module, a third estimation module and an LUT module. The configuration module provides a lower limit sensing value, an x-axis border inner-edge coordinate and an x-axis border outer-edge coordinate. The sensing value module provides an advanced sensing value according to a total sensing value of the touch panel. When the original x-axis coordinate is between the x-axis border inner-edge coordinate and the x-axis border outer-edge coordinate, and the advanced sensing value is greater than the lower limit sensing value, the x-axis correction module provides a corrected x-coordinate, for correcting the original x-coordinate, according to the original x-coordinate and the advanced sensing value. The first estimation module provides an x-axis correction starting coordinate according to the original x-coordinate and the advanced sensing value. The second estimation module provides an estimated gradient according to the original x-coordinate, the advanced sensing value and the original y-coordinate. The third estimation module provides an estimated ripple value according to the original x-coordinate, the advanced sensing value and the original y-coordinate. The y-axis correction module provides a corrected y-coordinate, for correcting the original y-coordinate, according to the original x-coordinate, the corrected x-coordinate and the advanced sensing value. When the corrected x-coordinate is located outside the x-axis correction starting coordinate, the y-axis correction module further provides an estimated y-axis correction value according to the original x-coordinate, the x-axis correction starting coordinate, the estimated gradient and the estimated ripple value, and provides the corrected y-coordinate according to the original y-coordinate and the estimated y-axis correction value (e.g., a linearity combination of the two).

Preferably, the LUT module provides an x-axis correction table, a plurality of sets of gradient value curve parameters, and a plurality of sets of ripple value curve parameters. The x-axis correction table records a plurality of x-axis correction values for a plurality of LUT sensing values and a plurality of LUT x-coordinates. Each of the x-axis correction values is associated with one of the LUT sensing values and one of the LUT x-coordinates. The LUT sensing values are further associated with a plurality of LUT touch controls sizes, respectively. Each set of gradient value curve parameters is associated with a first curve, and each first curve associates the original y-coordinate to a gradient. Each set of ripple value curve parameters is associated with a second curve, and each second curve associates the original y-coordinate to a ripple value.

When the original x-coordinate is between the x-axis border inner-edge coordinate and the x-axis border outer-edge coordinate, the x-axis correction module looks up a first LUT x-coordinate and a second LUT x-coordinate from the LUT x-coordinates according to the original x-axis, looks up a first LUT sensing value and a second LUT sensing value from the LUT sensing values according to the advanced sensing value, provides a plurality of x-axis correction values according to the x-axis correction table, such that each of the x-axis correction values is associated with one of the first LUT sensing value and the second LUT sensing value, and is associated with one of a first x-axis correction value and a second x-axis correction value. The x-axis correction module further interpolates the x-axis correction values according to the first LUT x-coordinate, the second LUT x-coordinate, the original x-coordinate, the first LUT sensing value, the second LUT sensing value and the advanced sensing value to obtain an estimated x-axis correction value, and provides the corrected x-coordinate according to a linearity combination of the original x-coordinate and the estimated x-axis correction value. The x-axis correction module further selects a first LUT touch control size and a second LUT touch control size, associated with the first LUT sensing value and the LUT sensing value, respectively, from the LUT touch control sizes. The x-axis correction value further interpolates the first LUT touch control size and the second LUT touch control size to obtain an estimated touch control size, such that the first estimation module provides the x-axis correction starting coordinate according to the estimated touch control size. The x-axis correction module further selects a first set of gradient value curve parameters and a second set of gradient value curve parameters, associated with the first LUT touch control size and the second LUT touch control size, respectively, from the sets of gradient value curve parameters. The second estimation module substitutes the original y-coordinate into the a first curve associated with the first set of gradient value curve parameters to obtain a first gradient, substitutes the original y-coordinate into a first curve associated with the second set of gradient value curve parameters to obtain a second gradient, and interpolates the first gradient and the second gradient to obtain an estimated gradient. The third estimation module selects a first set of ripple value curve parameters and a second set of ripple value curve parameters, associated with the first LUT touch control size and the second LUT touch control size, respectively, from the sets of ripple value curve parameters. The third estimation module further substitutes the original y-coordinate into a second curve associated with the first set of ripple value curve parameters to obtain a first ripple value, substitutes the original y-coordinate into a second curve associated with the second set of ripple value curve parameters to obtain a second ripple value, and interpolates the first ripple value and the second ripple value to obtain an estimated ripple value.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
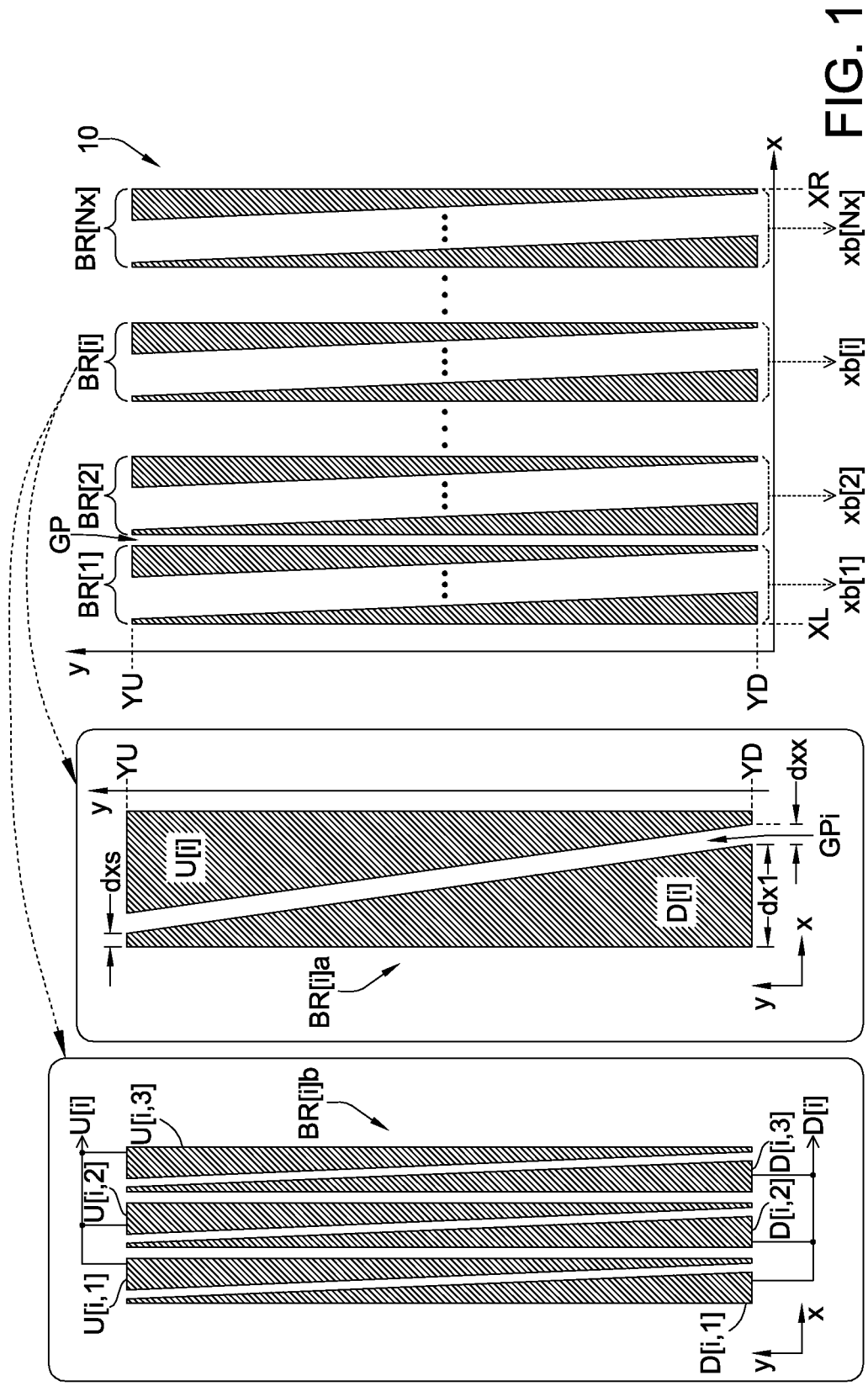
FIG. 1 shows a touch panel according to an embodiment of the present invention.

FIG. 1 shows a touch panel 10 according to an embodiment of the present invention. The touch panel 10 comprises a plurality of sensing electrode groups BR[1], BR[2], . . . , BR[i] to BR[Nx], which are formed on a same conductive layer. These sensing electrode groups are arranged along an x-axis direction and are distributed from an x-coordinate XL to an x-coordinate XR. Different sensing electrode groups are separated by respective gaps, e.g., a gap GP, and are thus insulated from one another. Each of the sensing electrode groups BR[i] comprises a plurality of sensing electrodes, each of which extends along a y-axis to distribute from a y-coordinate YD to a y-coordinate YU. A sensing region is defined by a rectangular region formed by the x-coordinates XL to XR and the y-coordinates YD to YU, i.e., a region distributed with the sensing electrodes is defined. The sensing electrodes of the sensing electrode groups sense self-coupling capacitance changes between before and after a user touch control, so as to allow the touch panel 10 to calculate an x-coordinate and a y-coordinate of a touch control position. The x-axis position of each of the sensing electrode groups BR[i] can be represented by an x-coordinate xb[i]. As different sensing electrode groups BR[i] are arranged along the x-axis, the x-coordinate of the touch control position can be calculated according to different sensing values of different sensing electrode groups BR[i].

FIG. 1 shows two embodiments BR[i]a and BR[i]b of the sensing electrode groups BR[i]. The sensing electrode group BR[i]a comprises an upper sensing electrode U[i] and a lower sensing electrode D[i], which are separated by an insulation gap GPi having a width dxx. To analyze a y-coordinate of the touch control position, a sectional width of the sensing electrode D[i] along an x-axis direction changes with the y-axis. For example, the x-axis sectional width of the sensing electrode D[i] at the y-coordinate YD is dx1, and is reduced to a smaller width dxs at the y-coordinate YU. Similarly, the sectional width of the sensing electrode U[i] along the x-axis direction also changes with the y-axis. For example, the sensing electrode U[i] has a smaller sectional width at the y-coordinate YD and a greater sectional width at the y-coordinate YU. The other embodiment BR[i]b of the sensing electrode group BR[i] comprises a plurality of pairs of sensing electrodes, e.g., sensing electrodes D[i, 1], U[i, 1], D[i, 2], U[i, 2], D[i, 3], and U[i, 3], with every two neighboring sensing electrodes being separated by an insulation gap. The sensing electrodes D[i, 1], D[i, 2] and D[i, 3] may be electrically connected to in equivalence form the lower electrode D[i]; the sensing electrodes U[i, 1], U[i, 2] and U[i, 3] may be electrically connected to in equivalence form the upper electrode U[i]. As the x-axis sectional width of the sensing electrodes D[i, j] decreases along the y-axis, the x-axis sectional width of the sensing electrodes U[i, j] increases along the y-axis.

Figure 2:
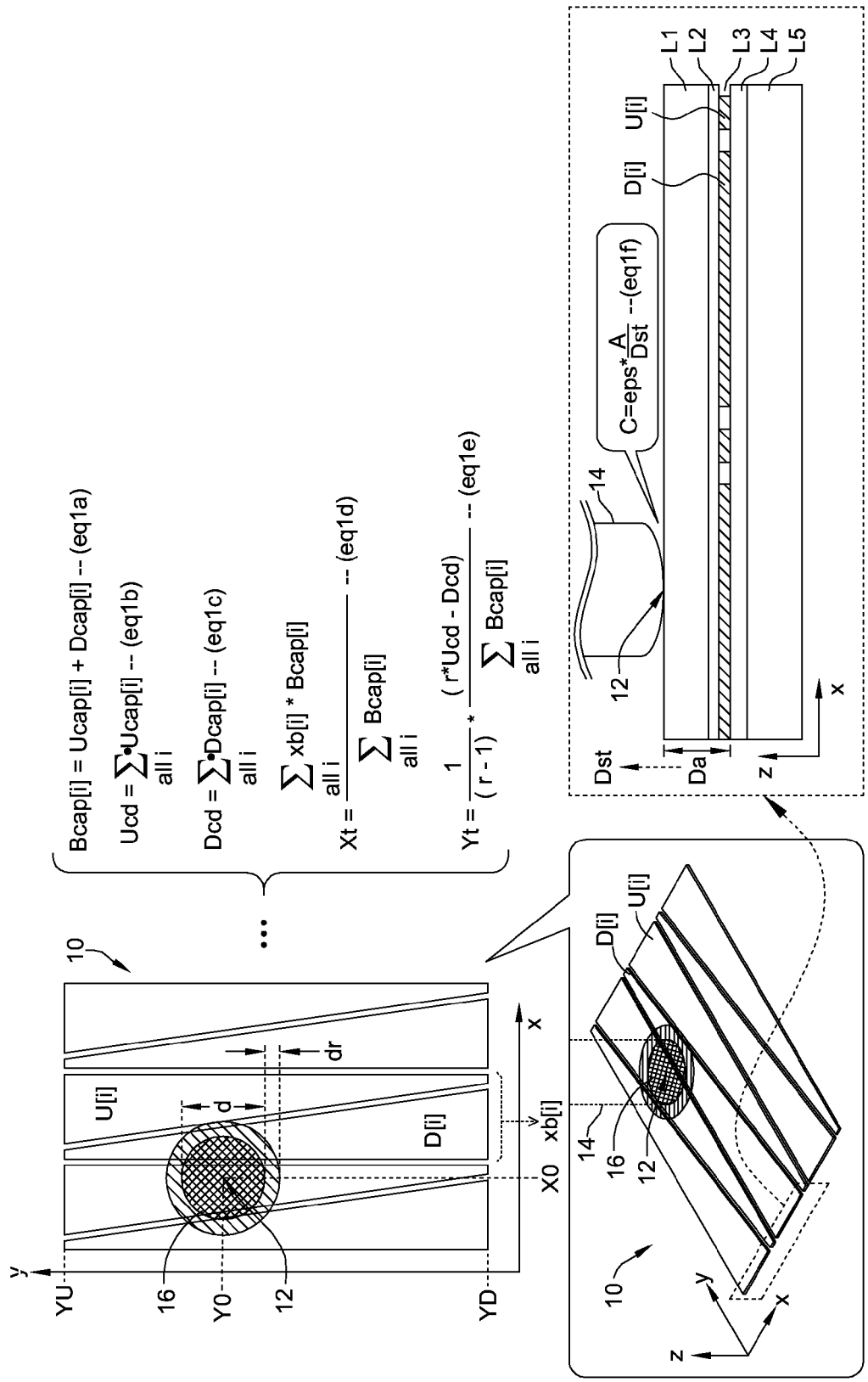
FIG. 2 shows principles of touch sensing of the touch panel in FIG. 1.

FIG. 2 shows principles of touch control of the touch panel 10. When a user performs a touch control at a touch control position 12 at coordinates (X0, Y0) using a touching object 14 (e.g., a finger or a stylus), the touch panel 10 may calculate for a set of original x-coordinate Xt and original y-coordinate Yt according to equations eq1a to eq1e to obtain a preliminary calculation result. In the equations eq1a to eq1e, a sensing value Ucap[i] is a self-coupling capacitance change sensed by the upper electrode U[i] in the sensing electrode group BR[i], and a sensing value Dcap[i] is a self-coupling capacitance change sensed by the lower electrode D[i] in the sensing electrode group BR[i]. A sensing value Bcap[i] is a sum of the sensing value Ucap[i] and the sensing value Dcap[i]. That is to say, the sensing value Bcap[i] is a total of the sensing values of all the sensing electrodes in the sensing electrode group BR[i]. The upper electrode sensing values Ucap[i] of all of the sensing electrode groups BR[i] are added to obtain a sensing value Ucd, and the lower electrode sensing values Dcap[i] of all of the sensing electrode groups BR[i] are added to obtain a sensing value Dcd. According to an x-coordinate xb[i] and the sensing value Bcap[i] of each of the sensing electrode groups BR[i], the original x-coordinate Xt can be obtained, as shown in the equation eq1d. According to the sensing values Ucd and Dcd, a design factor r and the sensing value of each of the sensing electrode groups BR[i], the original y-coordinate Yt can be obtained, as shown in the equation eq1e. The design factor r is associated with a shape of the sensing electrodes, and describes the trend (i.e., a gradient) that the x-axis sectional width changes along the y-axis.

A total sensing value C of the touch panel 10 is a total of the sensing values Bcap[[i] of all of the sensing electrodes BR[i], and may be modelized by use of a capacitance equation in electromagnetism, as shown in the equation eq1f in FIG. 2. In the equation eq1f, variables A, eps and Dst represent an area, a dielectric constant and a distance, respectively. The area A is associated with an xy-plane sectional area of the sensing region coming in contact with (and/or near) the touching object 14. For example, the touching object 14 may be modelized as a conductive column having a sectional diameter of a length d; a touch control area 16 on the xy-plane coming in contact with the touching object 14 may be modelized as a circle. A center of the circle is the touch control position 12, and has a diameter of a length d that may represent a touch control size of the touch control area 16. The touching object 14 contributes power lines of an electric field in the touch control area 16, and sensing values are contributed to the sensing electrodes if the power lines are captured by the sensing electrodes of the touch panel 10. Therefore, the area A in the equation eq1f is a part where the touch control area 16 overlaps the sensing electrodes. When modelizing the touch control area 16, in addition to the circle having a diameter in the length d, a circular region formed by outwardly extending a circumference of the circle by a length dr may also be considered, as the power lines of the electric field of the touching object 14 are also extended into the circular region.

The dielectric constant eps and the distance Dst in the equation eq1f are associated with a stack structure of the touch panel 10. As shown in FIG. 2, the touch panel 10 is formed by stacking stack layers L1 to L5 along a z-axis. For example, the stack layer L1 may be a transparent non-conductive layer (e.g., a glass layer), the stack layer L2 may be a non-conductive adhesive layer, the stack layer L3 may be a transparent conductive layer for forming the sensing electrodes, the stack layer L4 may be another non-conductive layer applied with an adhesive material, and the stack layer L5 may be a display panel. The distance Dst is associated with a z-direction distance Da between the touch control position 12 and the stack layer L3. Since the stack layer L5 is electrically connected to a constant voltage (e.g., a ground voltage), the distance Dst is also associated with z-axis positions of the stack layers L4 and L5. The dielectric constant eps is primarily associated with dielectric constants and thicknesses of the stack layers L1 and L2.

By replacing the area A in the equation eq1f with the xy-plane sectional area of the sensing electrodes D[i] or U[i] covered by projection of the touch control object 14, the sensing value Dcap[i] or Ucap[i] may be estimated with the equation eq1f. For example, the sensing value Dcap[i] may be calculated as: Dcap[1]=eps*Ap/Dst, where the variable Ap is an overlapping part between the touch control area 16 and the sensing electrode D[i] on the xy-plane. In other words, among all of the sensing electrode groups BR[1] to BR[Nx], when a sensing value Bcap[i0] of a sensing electrode group BR[i0] is in a greater value, it means that a large part of the touch control area 16 of the touching object 14 is covered on the sensing electrodes D[i] and U[i], and so the x-coordinate X0 of the touch control position 12 is close to an x-coordinate xb[i0] of the sensing electrode group BR[i0]. Similarly, in a same sensing electrode group BR[i], when the sensing value Ucap[i] of the electrode U[i] is greater than the sensing value Dcap[i] of the electrode D[i], it means that an overlapping part of the touch control area 16 upon the electrode U[i] is greater in a way that the y-coordinate Y0 of the touch control position 12 closer to one end the upper electrode U[i] having larger x-axis width.

Referring to FIG. 2, since the overlapping part of the touch control area upon the sensing region is associated with the total sensing value C of all of the sensing electrodes, whether the original coordinates (Xt, Yt) calculated according to the size of the total sensing value C are valid may be determined when calculating touch control coordinates. When the total sensing value C of a touch control operation is too small, the accuracy of the calculated touch control coordinates may be easily affected by noises in the sensing value, and so the original coordinates (Xt, Yt) accordingly calculated are considered unreliable and eliminated. Thus, the touch control operation is regarded as an invalid touch control operation, and it equivalently means that no touch control is sensed. When the total sensing value C of a touch control operation is too large, it means that the touch control operation is most probably an unintended touch control by a user's palm (or another large-area object), and the original coordinates (Xt, Yt) calculated may also be eliminated. In other words, a touch control elimination rule can be integrated when calculating the touch control coordinates to eliminate extremely large (greater than an upper limit) or extremely small (smaller than a lower limit) original coordinates obtained.

Figure 3:
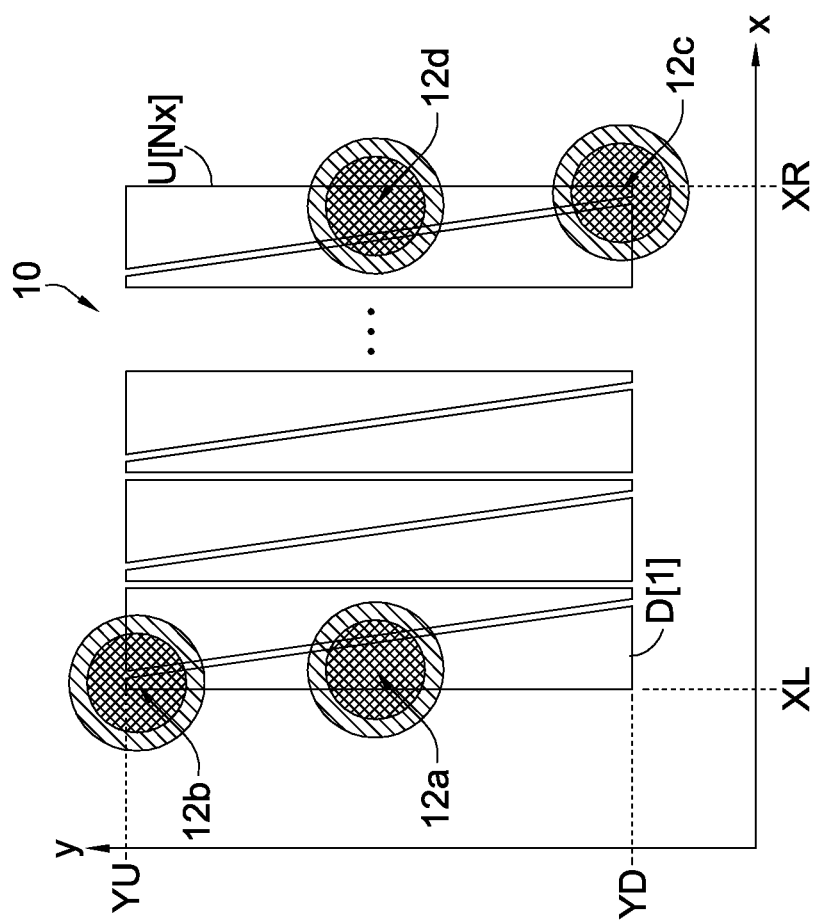
FIG. 3 shows several situations that easily affect coordinate calculation in touch control.

Without involving an extra conductive layer, all of the electrodes for touch sensing of the touch panel 10 are disposed on a same conductive layer (e.g., the stack layer 13). Thus, the touch panel 10 is low in cost with an easy manufacturing process, and also offers a simple, intuitive and friendly touch control interface that promotes prevalence for benefiting a greater number of users. However, as gaps are required between the sensing electrodes for separating the sensing electrodes from one another, parts of the touch control area covering the gaps do not (or less) contribute sensing values to the sensing electrodes, such that the accuracy of the touch control coordinates calculated may be affected. Further, the calculation of the touch control coordinates may also be affected if the touch control area partly exceeds the sensing region where the sensing electrodes are located. FIG. 3 shows exemplary situations that easily affect the calculation for touch control coordinates. In the touch panel 10, the sensing electrodes are arranged along the x-axis from the coordinate XR to the coordinate XL and along the y-axis from the coordinate YD to the coordinate YU to form a rectangular sensing region. When a user touches a touch control position 12a, the touch control area partially exceeds the x-coordinate XL. The exceeding part cannot provide a sensing value to the sensing electrodes in the sensing region, and so the calculation for the touch control coordinates is affected. When calculating the original coordinates (Xt, Yt) according to the equations eq1a to eq1e, the original x-coordinate Xt is farther away from the x-coordinate XL than a real x-coordinate of the touch control position 12a (i.e., closer to a center of the sensing region), and the y-coordinate Yt is closer to the y-coordinate YD than a real y-coordinate of the touch control position 12a. Similarly, when a user touches a touch control position 12d, the calculation for the touch control coordinates is also affected as the touch control area partially exceeds the sensing region, such that the preliminarily calculated original x-coordinate Xt is farther away from the x-coordinate XR than a real x-coordinate of the touch control position 12d (i.e., closer to the center of the sensing region), and the original y-coordinate Yt is closer to the y-coordinate YU than a real y-coordinate of the touch control position 12d.

When a user touches a touch control position 12b, a remarkable part of the touch control area exceeds the upper-left x-coordinate XL and y-coordinate YU. At this corner, only the sensing electrode D[1] captures the control area by its one end having a smaller x-axis sectional width. As such, the missed part of the control region is greater and thus the calculation for the touch control coordinates is affected at an even larger scope (compared to the situation for the touch control position 12a). Similar to the situation of the touch control position 12b, when a user touches a touch control position 12c, the touch control area exceeds the lower-right x-coordinate XR and y-coordinate YD in a way that the calculation for the touch control coordinates is also greatly affected. It is known from the above discussion that, when a touch control position falls near a border of a side and/or a corner of the sensing area, the calculation for the touch control coordinates is severely affected. When the part of a touch control area within the sensing region is too small, the original coordinates (Xt, Yt) calculated are prone to elimination based on the above touch control elimination rule.

Further, a size of the touch control area also affects the calculation for the touch control coordinates. When the touch control position is close to a side of the sensing region, the touch control area gets larger and is thus more likely to be located outside the sensing region. For example, assuming that the touch control area is a circle having a diameter of 5 mm, the touch control position at its center only partially exceeds the sensing region when the touch control position falls within 2.5 mm from the side of the sensing region. In contrast, assuming that the touch control area is a circle having a diameter of 12 mm, the touch control position at its center already partially exceeds the sensing region when the touch control position falls within 6 mm from the side of the sensing region.

Figure 4:
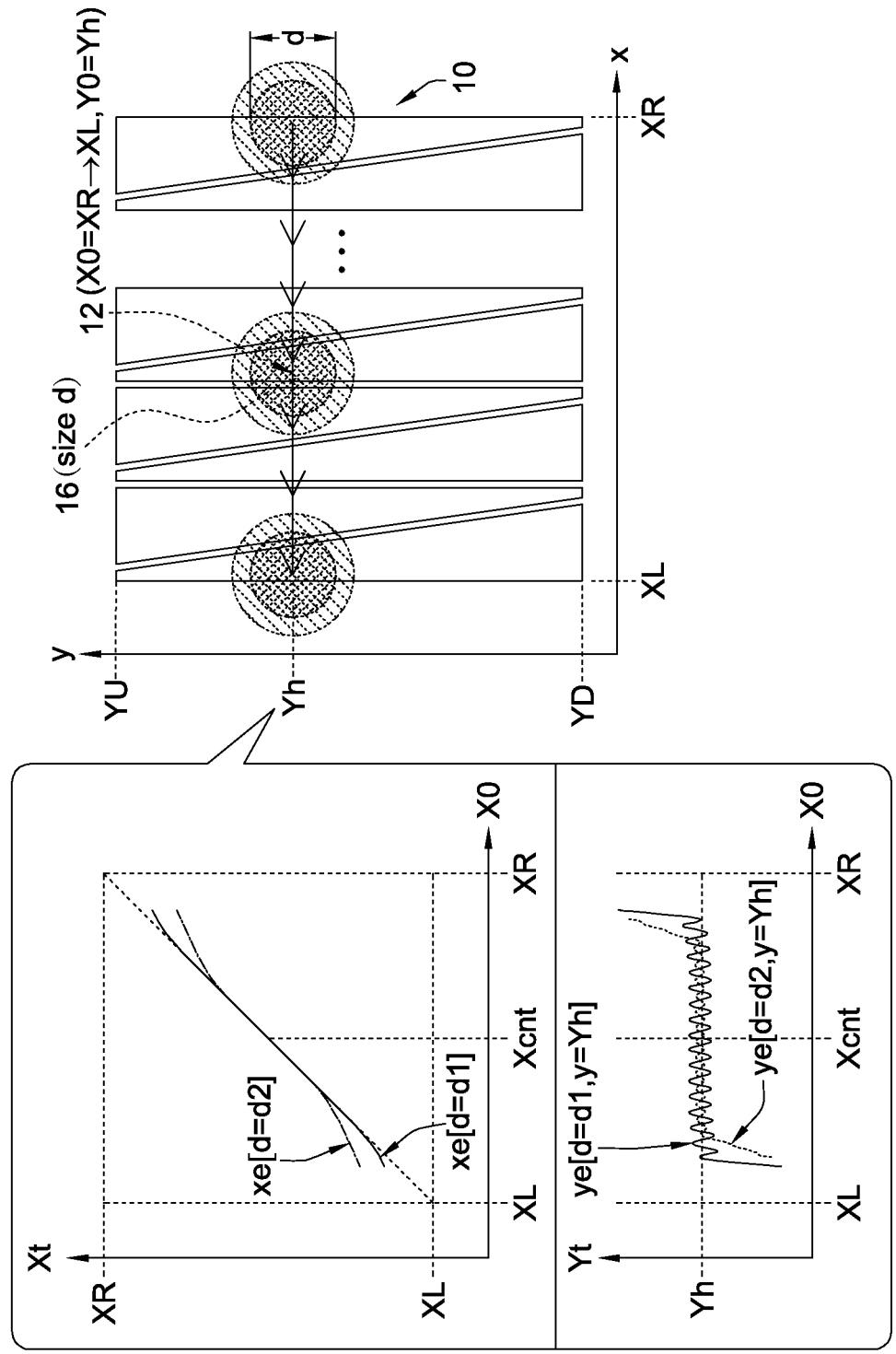
FIG. 4 shows original coordinates calculated when moving a touch control position along an x-axis while keeping a y-coordinate fixed.

To systematically modelize calculation errors in touch control coordinates, in one embodiment, given that a y-axis is remained fixed, a touch control position is repeatedly moved from one side to the other side of a sensing region along an x-axis for touch control areas having different sizes and different y-coordinates, so as to consider an x-coordinate error and a y-coordinate error caused by different touch control positions as well as different touch control areas (touch control sizes). FIG. 4 shows original coordinates (Xt, Yt) calculated when moving a touch control area 16 of a touch control position 12 from one side to the other side of the sensing area along the x-axis, under the premise that the y-coordinate is kept fixed at the coordinate Yh. Real coordinates of the touch control position 12 are (X0, Y0), and a length d represents the touch control size of the touch control area 16. In a situation where the y-coordinate Y0 of the touch control position 12 is kept fixed at the coordinate Yh, when the x-coordinate X0 changes from a coordinate XR (one side of the sensing region) to a coordinate XL (the other side of the sensing region), if the touch control size d is equal to a fixed length d1, a relationship between the calculated original x-coordinate Xt of the touch control position 12 and the real x-coordinate X0 of the touch control position 12 is as shown by a curve xe[d=d1]. If the touch control size d is equal to a greater fixed length d2 (i.e., d2>d1), a relationship between the calculated original x-coordinate Xt and the real x-coordinate X0 can be described by a curve xe[d=d2]. In FIG. 4, an x-coordinate Xcnt represents an x-axis central point of the sensing region, i.e., Xcnt=(XR+XL)/2.

As shown by the curves xe[d=d1] and xe[d=d2], as the touch control position 12 gets closer to two sides of the sensing region, the original x-coordinate Xt from the preliminary calculation deviates farther from the real x-coordinate X0 of the touch control position 12. Moreover, as the touch control size d (in equivalence the touch control area 16) gets larger, the original x-coordinate Xt starts deviating at a greater deviation level from the real x-coordinate X0 from a position farther away from the sensing region. Due to the touch control elimination rule, the calculated original x-coordinate Xt of the touch control position 12 does not reach the two sides of the sensing region (i.e., the x-coordinates XR and XL).

Under the condition that the y-coordinate Y0 of the touch control position 12 is a fixed coordinate Yh, when the x-coordinate X0 changes from the coordinate XR to the coordinate XL, if the touch control size d is equal to the length d1, a relationship between the calculated original y-coordinate Yt and original x-coordinate Xt of the touch control position 12 is as shown by a curve ye[d=d1, y=Yh]; if the touch control size d is the longer length d2, a relationship between the calculated original y-coordinate Yt and original x-coordinate Xt of the touch control position can be described by a curve ye=[d=d2, y=Yh].

As shown by the curves ye[d=d1, y=Yh] and ye[d=d2, y=Yh], when the x-coordinate of the touch control position 12 moves near the central x-coordinate Xcnt of the sensing region, the calculated original y-coordinate Yt deviates from the real y-coordinate Yh in a ripple manner or by a positive or negative amplitude. When the x-coordinate of the touch control position 12 changes, since the touch control area 16 of the touch control position 12 in turn passes through the upper electrode, the lower electrode and the electrode gap, a ripple deviation is formed.

When the x-coordinate of the touch control position 12 gets away from the central x-coordinate Xcnt to gradually approach the side of the sensing region, the original y-coordinate Yt obtained from the preliminary calculation is considerably deviated from the real y-coordinate Yh of the touch control position in a linear manner. When the touch control size is smaller (e.g., when equal to the length d1), the level of ripple deviation is larger, with however the ripple deviation showing linearity at a position closer to the side of the sensing region. The level of ripple deviation also increases drastically as the x-coordinate X0 approaches the side of the sensing region. Further, the curves ye[d=d1, y=Yh] and ye[d=d2, y=Yh] also change along with changes in the y-coordinate Yh.

By appropriately adjusting sizes of the sensing electrodes and the insulation gaps, the level of ripple deviation of the y-coordinate can be controlled within a tolerable range acceptable to manufacturers of associated fields. In other words, the sensing region of the touch panel has a central region. In the central region, if the original y-coordinate Yt is deviated from the real y-coordinate of the touch control position by an acceptable level of ripple deviation and the original x-coordinate is also deviated from the real x-coordinate X0 by a tolerable range, such original coordinates (Xt, Yt) do not need to be corrected. However, when the touch control position is outside the border of the central region and approaches the side of the sensing region, not only the x-coordinate needs to be corrected, but also the y-coordinate needs to be corrected if the linear deviation of the y-coordinate is greater than an acceptable tolerable range.

Figure 5:
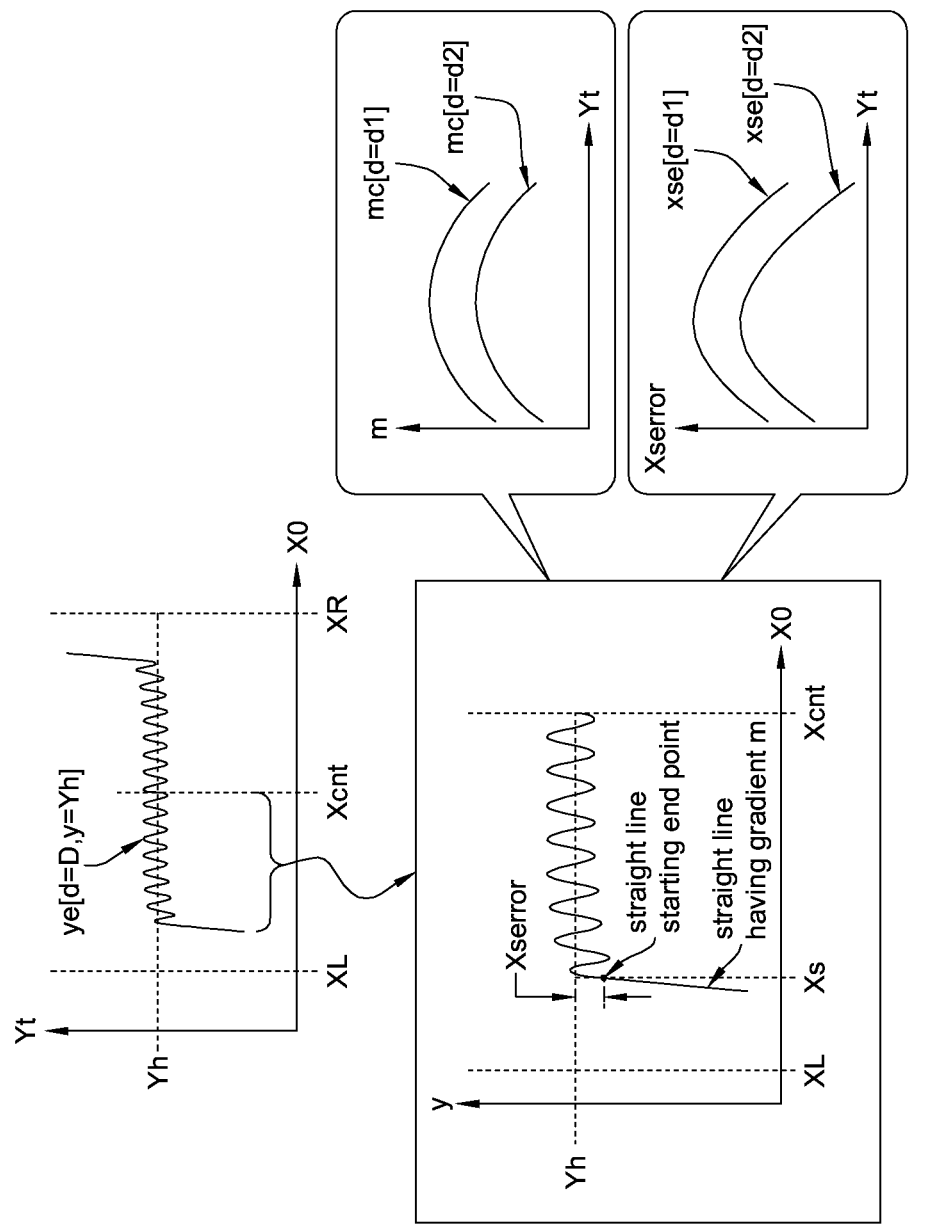
FIG. 5 shows details of modelizing curves in FIG. 4 according to an embodiment of the present invention.

To correct the linear deviation of the y-coordinate, in the embodiment, the curve ye[d=D, y=Yh] (the length D may be the length d1 or d2) is modelized, as shown in FIG. 5. In the curve ye[d=D, y=Yh], a part of the linear deviation of the y-coordinate may be modelized as a straight line having a gradient m. The straight line and the deviated part intersect at a straight line starting end point, which has an x-coordinate Xs and a y-axis that is deviated from the coordinate Yh by a ripple value Xserror. The x-coordinate Xs is an x-axis correction starting coordinate, and is equal to ((D/2)+dr), for example. As discussed in descriptions associated with FIG. 2, the touch control area 16 of the touch control position 12 may be modelized into a circle having a radius ((D/2)+dr). Therefore, when a distance between the x-coordinate of the touch control position 12 and the side of the sensing region is smaller than the radius ((D/2)+dr), a part of the touch control area 16 is not overlapped with any sensing electrodes, and then causes the deviation in the original y-coordinate Yt obtained from calculating the touch control position.

In the curve ye[d=D, y=yH], when the x-coordinate of the touch control position 12 is (Xs+Xripple) that is between the coordinates Xs and Xcnt, an offset value exists between the preliminarily calculated original y-coordinate Yt and the coordinate Yh, and the ripple value Xserror can be obtained according to the offset value. The coordinate Xripple is associated with an x-axis total width of the sensing electrodes and an x-axis width of the gaps. For example, for the sensing electrode group BR[i]a in FIG. 1, the coordinate Xripple may be equal to (dx1+dxs+2*dxx). For the part with linear deviation, both of the gradient m and the ripple value Xserror are associated with the touch control size d as well as with the coordinate Yh, which is in equivalence associated with the original y-coordinate Yt. In FIG. 5, when the touch control size d is the length d1, a curve mc[d=d1] describes a situation where the gradient m changes with the original y-coordinate Yt, and a curve xse[d=d1] describes a situation where the ripple value Xserror changes with the original y-coordinate Yt. When the touch control size d is the length d2, a relationship of the gradient m changing with the original y-coordinate Yt is as shown by a curve mc[d=d2], and a corresponding relationship between the ripple value Xserror and the original y-coordinate Yt is as described by a curve xse[d=d2].

Preferably, the curves mc[d=.] and xse[d=.] may be modelized by a conic section (e.g., a parabola). For example, in a conic model, when the touch control size d is equal to the length D, the gradient m may be calculated as: $m=a1[D]*(Yt^2)+b1[D]*Yt+c1[D]$, and the ripple value Xserror may be calculated as: $Xserror=a2[D]*(Yt^2)+b2[D]*Yt+c2[D]$, where a1 [D], b1 [D], c1 [D], a2[D], b2[D] and c2[D] are coefficients that may be functions of the length D. That is to say, different lengths D are associated with coefficients in different values.

It is known from FIG. 4 that, assuming that the known touch control size d is equal to the length d1 (or d2), after obtaining the original x-coordinate Xt preliminarily calculated by the touch panel 10, the real x-coordinate X0 of the touch control position 12 can be reversely deduced according to the curve xe[d=d1] (or xe[d=d2]). Similarly, as shown in FIG. 5, assuming the known touch control size d is equal to the length d1 (or d2), the coordinate Xs can be obtained according to the touch control size d. After obtaining the original y-coordinate Yt calculated by the touch panel 10, the gradient m and the ripple value Xserror can be obtained according to the curves mc[d=d1] and xse[d=1] (or curves mc[d=d2] and xse[d=d2]) to further reversely deduce the real y-coordinate Yh of the touch control position 12. According to the above principles, the embodiment is capable of correcting the original coordinates (Xt, Yt) provided by the touch panel 10. Preferably, the touch control size may be estimated through the total sensing value C. For example, in the embodiment, for different touch control sizes d[1], d[2] to d[k], the total sensing value C sensed by the touch panel 10 for each of the touch control sizes can be obtained through simulations of electromagnetic values or experimental values. To correct the original coordinates (Xt, Yt), if the total sensing value C is between the total sensing values corresponding to touch control sizes d[k1] and d[k2], it can be deduced that the actual touch control size is between the touch controls sizes d[k1] and d[k2], and the actual touch control size can be estimated by interpolation.

Figure 6:
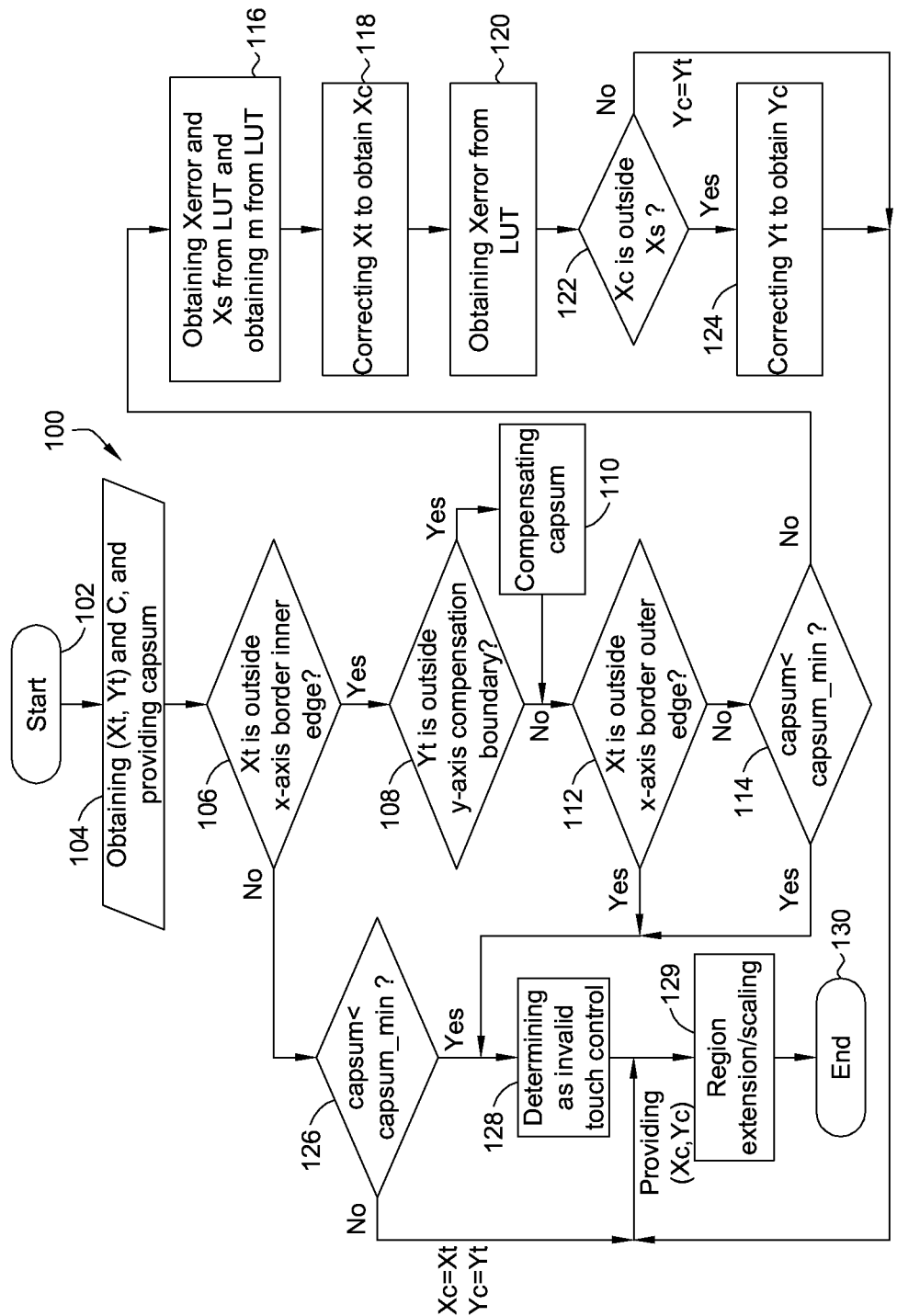
FIG. 6 shows a flowchart of a method for coordinate correction of touch control according to an embodiment of the present invention.

FIG. 6 shows flowchart of a process 100 according to an embodiment of the present invention. The process 100, for coordinate correction according to the total sensing value C sensed by the touch panel 10 and the preliminarily calculated original coordinates (Xt, Yt), comprises the following steps.

The process 100 begins with step 102.

In step 104, the total sensing value C sensed by the touch panel 10 and the preliminarily calculated original coordinates (Xt, Yt) are obtained, and an advanced sensing value capsum is provided according to the total sensing value C. In one embodiment, a value of the advanced sensing value capsum increases as a value of the total sensing value C becomes larger. Alternatively, an advanced sensing value smaller than the total sensing value may be utilized to represent the total sensing value to reduce computation resources required by the process 100. For example, the advanced sensing value capsum may be a square root of the total sensing value C.

Figure 7:
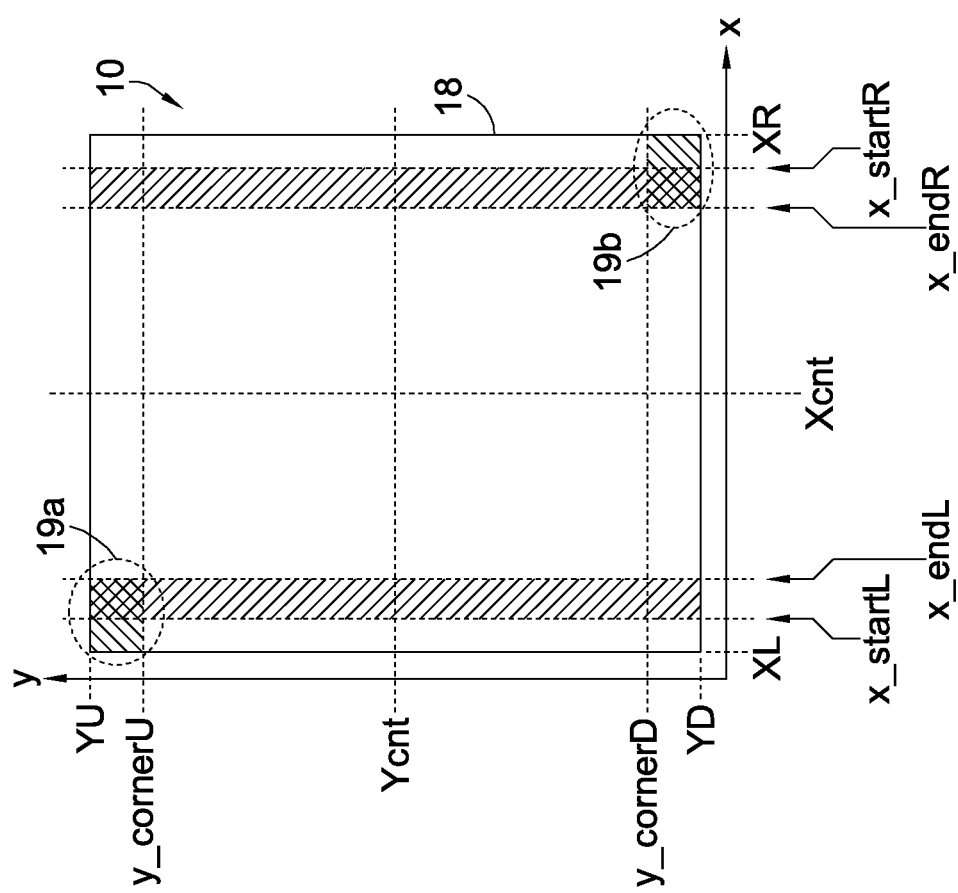
FIG. 7 shows coordinates referred to when performing the flowchart in FIG. 6.

In step 106, when the original x-coordinate Xt is outside a border inner edge of an x-axis border, step 108 is performed, or else step 126 is performed. FIG. 7 shows borders of the touch panel 10. In the sensing region 18 of the touch panel 10, x-axis border inner edges are defined by predetermined x-coordinates x_endL and x_endR, and x-axis border outer edges are defined by predetermined x-coordinates x_startL and x_startR. A region between the coordinates x_endL and x_startL, regarded as an x-axis border range, is a left border of the sensing region 18. A region between the coordinates y_endR and x_startR, regarded as another x-axis border range, is a right border of the sensing region 18. A region between the coordinates x_endL and x_endR may be regarded as a central region of the sensing region 18. Preferably, the coordinates x_startL and x_startR are in a reflection symmetry by regarding the x-axis central coordinate Xcnt of the sensing region 18 as a center, and the coordinates x_endL and x_endR are also in a reflection symmetry by regarding the x-axis central coordinate Xcnt of the sensing region 18 as a center.

As shown in FIGS. 4 and 5, within the central region of the sensing region, errors in the original coordinates (Xt, Yt) are both in an acceptable tolerable range. However, the original coordinates (Xt, Yt) need to be corrected if they are close to the sides of the sensing region and fall within the borders of the sensing region. In the embodiment, the original x-coordinate Xt is corrected only if it falls within the border. In step 106, it is determined whether the original coordinate Xt is in the border outside the x-axis border inner edge, e.g., whether the original x-coordinate Xt is smaller than the coordinate x_endL. Step 108 is performed if yes, or else step 126 is performed.

In step 108, when the original y-coordinate Yt is located outside a y-axis compensation boundary, step 110 is performed, or else step 112 is performed. As shown in FIG. 7, y-axis compensation boundaries are defined by predetermined y-coordinates y_cornerU and y_cornerD within the sensing region 18. In the embodiment, the coordinates y_cornerU and y_cornerD are in a reflection symmetry by regarding a y-axis central coordinate Ycnt as a center, where Ycnt=(YU+YR)/2. When the original y-coordinate is outside the y-axis compensation boundary, e.g., greater than y_cornerU, step 110 is performed, or else step 112 is performed.

In step 110, the advanced sensing value capsum is updated/compensated, e.g., by increasing the advanced sensing value capsum. When step 110 is performed from steps 106 and 108, it means that the original coordinates (Xt, Yt) are located at a border 19a or 19b of the sensing region 18. As previously described in association with FIG. 3, when the touch control area falls at the upper-left or lower-right corner of the sensing region, the total sensing value C and the derived advanced sensing value capsum are both lower as the sensing electrodes can only sense the touch control are with regions having a shorter x-axis sectional length. The purpose of step 110 is to compensate the advanced sensing value capsum having a lower value by increasing the advanced sensing value capsum, e.g., by directly setting the advanced sensing value capsum to a larger value. The process 100 proceeds to step 112 after step 110.

In step 112, when the original x-coordinate Xt is outside the x-axis border outer edge, e.g., when the original x-coordinate Xt and the coordinate Xcnt are at two different sides of the coordinate x_startL, respectively, step 128 is performed, or else step 114 is performed. For example, when the original x-coordinate Xt is smaller than the coordinate x_startL (FIG. 7), step 128 is performed, or else step 114 is performed. As previously discussed in association with FIG. 4, if the touch control position 12 is quite close to the side of the sensing region or even is outside the sensing region, the sensing result of the touch panel 10 is considered unreliable. Thus, the process 100 may proceed to step 128 to eliminate the original coordinates (Xt, Yt) as such original coordinates (Xt, Yt) as need not be further corrected.

In step 114, when the advanced sensing value capsum is smaller than a lower limit sensing value capsum_min, step 128 is performed, or else step 116 is performed. According to touch control elimination rules, when the advanced sensing value capsum is smaller than the lower limit sensing value capsum_min, it means that the total sensing value is too small such that the original coordinates (Xt, Yt) are to be discarded. Thus, in step 114, it is determined whether the original x-coordinate Xt is valid according to the size of the advanced sensing value capsum.

Figure 8:
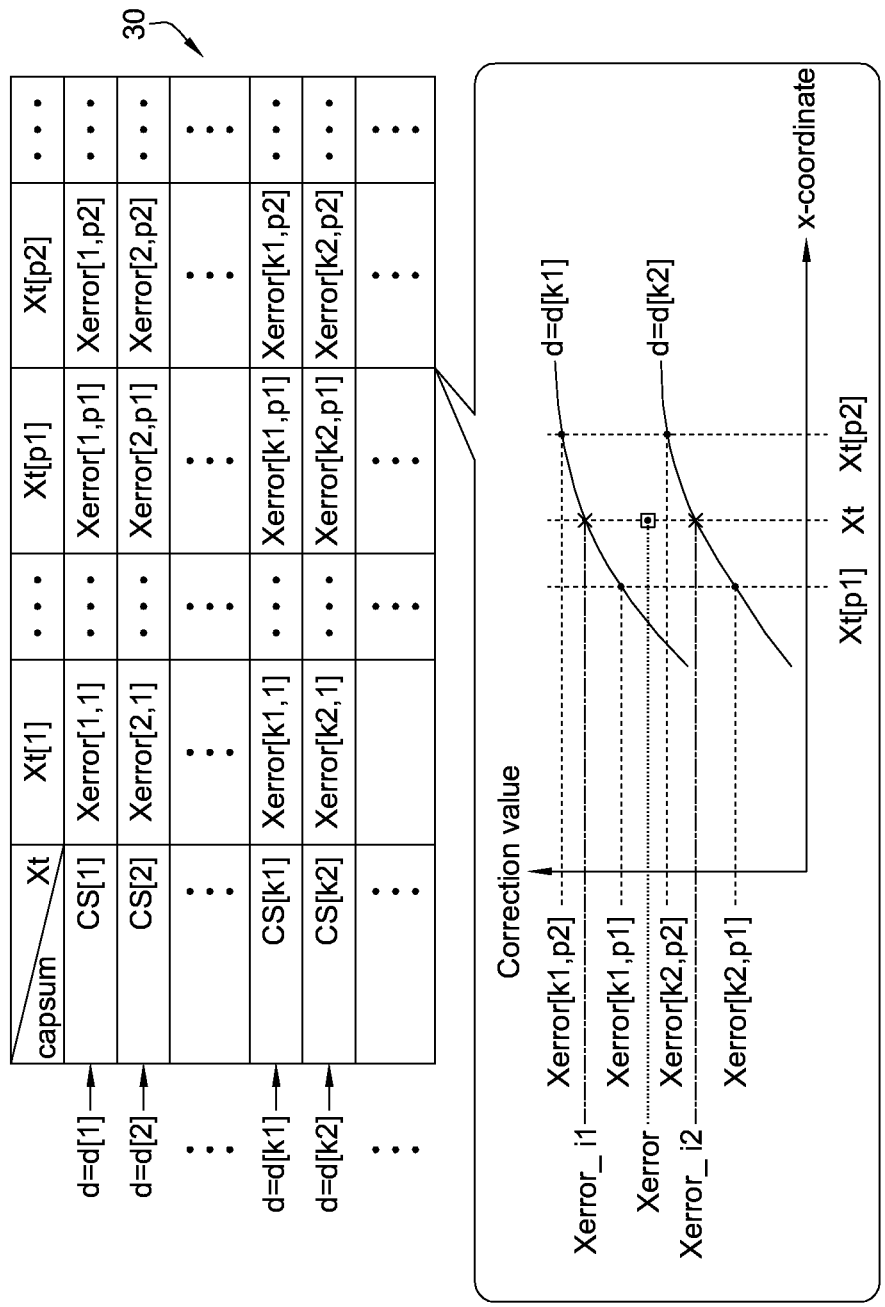
FIGS. 8 to 11 are operation embodiments of different steps in the flowchart in FIG. 6.

When step 116 is performed after steps 106, 112 and 114, it means that the original x-coordinate Xt is between the x-axis border inner edge and the x-axis border outer edge, and the advanced sensing value capsum is not in an unacceptably small value. In step 116, a correction value Xerror is obtained to accordingly correct the original x-coordinate Xt. FIG. 8 shows a schematic diagram of obtaining the correction value Xerror according to an embodiment of the present invention. As discussed in association with FIG. 4, in the embodiment, the corresponding curves xe[d=d1] and xe[d=d2] for different touch sizes d=d1 and d2 may be provided in advance to correspond different original x-coordinates Xt to the real x-coordinate X0. Accordingly, a look-up table (LUT) 30 in FIG. 8 can be established. The LUT 30 is an x-axis correction table that records a plurality of x-axis correction values (e.g., correction values Xerror[1, 1], Xerror[1, 2], Xerror[2, 1] and Xerror [k1, p1]) for a plurality of LUT sensing values (e.g., sensing values CS[1], CS[2] and CS[k1]) and a plurality of LUT x-coordinates (e.g., coordinates Xt[1], Xt[2] and Xt[p1]), so as to associate the correction value Xerror[k1, p1] to the sensing value CS[k1] and the x-coordinate Xt[p1]. Each of the sensing values CS[k1] is also associated with the touch control size of the length d[k1].

In the LUT 30, the sensing value CS[k1] represents the advanced sensing value derived from the total sensing value when the touch control size d is the length d[k1]. The correction value Xerror[k1, p1] represents a difference between the real x-coordinate X0 and the original x-coordinate Xt[p1] when the touch control size d is the length d[k1] and if the original x-coordinate obtained from calculating the touch control coordinates is equal to Xt[p1]. That is to say, when the touch control size d is equal to the length d[k1], and the original x-coordinate obtained from calculating the touch control coordinates is equal to Xt[p1]. By shifting the original x-coordinate Xt[p1] with the correction value Xerror[k1, p1], the real x-coordinate X0 of the touch control position can be reversely deduced to correct the x-coordinate.

However, when correcting the original x-coordinate Xt, the touch panel 10 only provides the original coordinates (Xt, Yt) and the advanced sensing value capsum but not the touch control size. Thus, when performing step 116, two sensing values CS[.] closest to the advanced sensing value capsum may be looked up from the sensing values CS[1] and CS[2] in the LUT 30. Assuming that the value of the advanced sensing value capsum is between the sensing values CS[k1] and CS[k2], the real touch control size d is between the lengths d[k1] and d[k2]. Similarly, two coordinates Xt[.] closest to the original x-coordinate Xt can be looked up from the coordinates Xt[1] and Xt[2] listed in the LUT 30. In FIG. 8, assuming that the original x-coordinate is between the coordinates Xt[p1] and Xt[p2], four correction values Xerror[k1, p1], Xerror[k1, p2], Xerror[k2, p1] and Xerror[k2, p2] can be found from the LUT 30 according to the coordinates Xt[p1] and Xt[p2] and the sensing values CS[k1] and CS[k2].

The correction values Xerror[k1, p1] and Xerror[k1, p2] are interpolated according to relations between the coordinates Xt[p1], Xt and Xt[p2] to obtained an interpolation x-axis correction value Xerror_i1. For example, when a distance between the coordinates Xt and Xt[p1] is smaller than a distance between the coordinates Xt[p2] and Xt, the correction value Xerror_i1 is more approximate to the correction value Xerror[k1, p1]. Similarly, the correction values Xerror[k2, p1] and Xerror[k2, p2] are interpolated according to relations of the coordinates Xt[p1], Xt and Xt[p2] to obtain another x-axis correction value Xerrror_i2 Further, by interpolating the correction values Xerror_i1 and Xerror_i2 according to relations of the sensing value CS[k1], the advanced sensing value capsum and the sensing value SC[k2], the correction value Xerror as an estimated x-axis correction value can be obtained.

As discussion in association with FIG. 5, the coordinate Xs can be obtained with the known touch control size d, and the gradient m and the rippler value Xserror can be obtained according to the touch control size d and the original y-coordinate Yt. According to the coordinate Xs, the original x-coordinate Xt, the gradient m and the ripple value Xserror, the real y-coordinate of the touch control position can be reversely deduced to accordingly correct the original y-coordinate. When performing the process 100, a length d_i, to be regarded as an estimated value of the touch control size d, may be obtained according to the advanced sensing value capsum. For example, the lengths d[k1] and d[k2] are interpolated according to relations of the sensing value CS[k1], the advanced sensing value capsum and the sensing value CS[k2] to obtain the length d_i as the estimated touch control size. The coordinate Xs in FIG. 5 can be obtained according to the length d_i.

Figure 9:
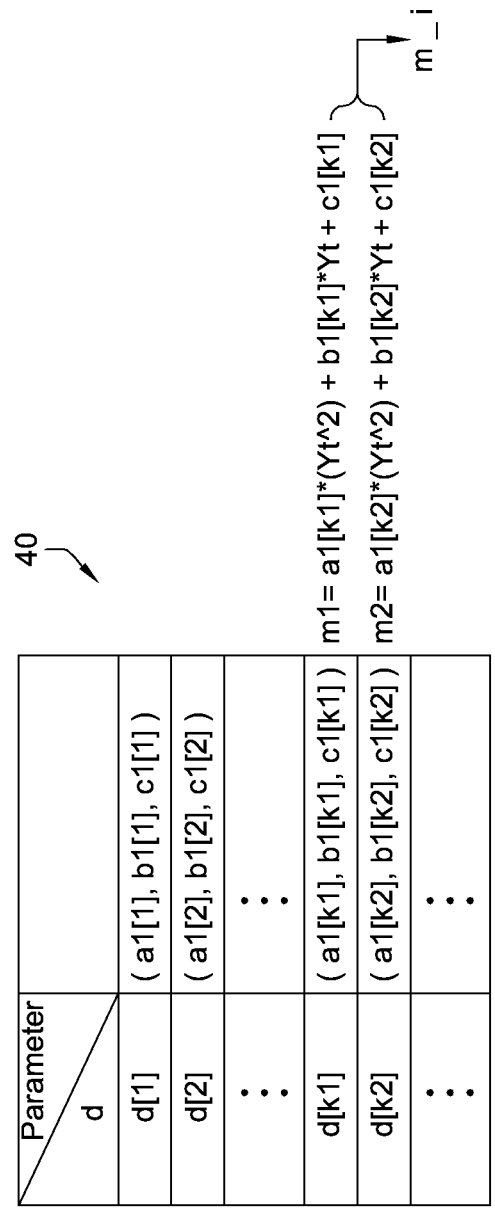

FIG. 9 shows an LUT 40 according to an embodiment of the present invention. With the LUT 40, an estimated gradient m_i can be accordingly obtained as the gradient m in FIG. 5. In the LUT 40, a plurality of touch control sizes (e.g., the lengths d[1] and d[2]) are associated with a plurality of sets of gradient value curve parameters (e.g., coefficients (a1[1], b1[1], c1[1]), and (a1[2], b1[2], c1[2])). Each set of gradient value curve parameters is associated with a curve (e.g., a conic section, as the curve mc[d=.] in FIG. 5), and each curve associates the original y-coordinate Ty to the gradient m. In continuation of the example in FIG. 8, it is learned from the advanced sensing value capsum that the touch control size d is between the lengths d[k1] and d[k2]. Accordingly, the coefficients (a1 [1], b1 [1], c1 [1]), and (a1 [2], b1 [2], c1 [2]) associated with the lengths d[k1] and d[k2] are found from the LUT 40 in FIG. 9. By substituting the original y-coordinate Yt into the curve associated with the coefficients (a1 [1], b1 [1], c1 [1]), a gradient m1 is obtained. That is, m1=a1 [k1]*(Yt^2)+b1 [k1]*Yt+c1 [k1]. Similarly, by substituting the original y-coordinate Yt into the curve associated with (a1 [2], b1 [2], c1 [2]), a gradient m2 is obtained, as shown in FIG. 9. According to the relations of the lengths d[k1], d_i and d[k2], the gradients m1 and m2 are interpolated to obtain the gradient m_i as the gradient m in FIG. 5.

After obtaining the correction value Xerror, the coordinate Xs and the gradient m_i through interpolation by use of the LUTs 30 and 40, the process 100 then proceeds to step 118 from step 116.

In step 118, the original x-coordinate Xt is shifted by the correction value Xerror to accordingly provide a corrected x-coordinate Xc for correcting the original x-coordinate Xt. That is, Xc=(Xt−Xerror). The process 100 then proceeds to step 120.

Figure 10:
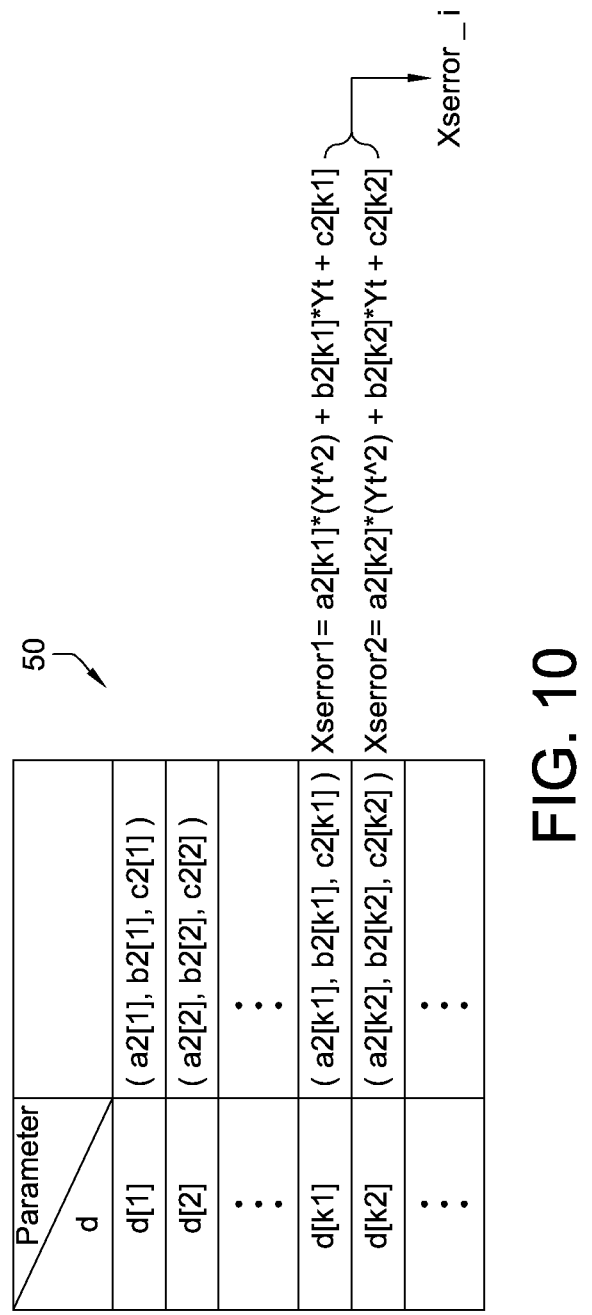

In preparation for correcting the original y-coordinate Yt according to the principles in FIG. 5, the gradient m_i and the coordinate Xs are obtained in step 116. In step 120, a ripple value Xserror_i, as an estimated ripple value to be regarded as the ripple value Xserror, is obtained. FIG. 10 shows an LUT 50 according to an embodiment of the present invention for accordingly obtaining the ripple value Xserror_i. In the LUT 50, a plurality of touch control sizes (e.g., the lengths d[1] and d[2]) are associated with a plurality of sets of ripple value curve parameters (e.g., the coefficients (a2[1], b2[1], c2[1]) and (a2[2], b2[2], c2[2])). Each set of ripple value curve parameters is associated with a curve (e.g., a conic section such as the curve xse[d=.] in FIG. 5), and each curve associates the original y-coordinate to a ripple value Xserror. In continuation of descriptions associated with FIG. 8, it is learned that the touch control size d is between the lengths d[k1] and d[k2] from the advanced sensing value capsum. Accordingly, the coefficients (a2[1], b2[1], c2[1]) and (a2[2], b2[2], c2[2]) associated with the lengths d[k1] and d[k2] can be found from the LUT 50. By substituting the original y-coordinate Yt into the curve associated with the coefficients (a2[1], b2[1], c2[1]), a ripple value Xserror1 can be obtained. That is, Xserror1=a2[k1]* (Yt^2)+b2[k1]*Yt+c2[k1]. Similarly, by substituting the original y-coordinate Yt into the curve associated with the coefficients (a2[2], b2[2], c2[2]), another ripple value Xserror2 may be obtained, as shown in FIG. 10. According to the relations of the lengths d[k1], d_i and d[k2], the ripple values Xserror1 and Xserror2 are interpolated to obtain the ripple value Xserror_i as the ripple value Xserror in FIG. 5.

In step 122, when the corrected x-coordinate Xc in step 118 is outside the coordinate Xs (step 116), e.g., Xc<Xs, step 124 is performed, or else step 130 is performed. As shown in FIG. 5, only when the x-coordinate of the touch control position is outside the coordinate Xs and away from the central coordinate Xcnt of the sensing region, the original y-coordinate Yt needs to be corrected by a linear model of the gradient m and the ripple value Xserror. Therefore, according to the coordinate Xs provided in step 116, when the corrected coordinate Xc is outside the coordinate Xs (i.e., the correction x-coordinate Xc and the coordinate Xcnt are at two different sides of the coordinate Xs, respectively), the original y-coordinate Yt needs to be further corrected in step 124. Conversely, when the corrected x-coordinate Xc is inside the coordinate Xs, since the original y-coordinate Yt does not deviate from the real y-coordinate of the touch control position by a level exceeding the tolerable range, the original y-coordinate Yt may be directly regarded as the corrected y-coordinate Yc. Jointly with the corrected x-coordinate Xc of step 118, the coordinates (Xc, Yc) are completely corrected to be more close to the real coordinates of the touch control position.

In step 124, a correction value Yerror as an estimated y-axis correction value is calculated according to the linear model of the gradient m and the ripple value Xserror, and the original y-coordinate is shifted by the correction value Yerror to provide a corrected y-coordinate Yc for correcting the original y-coordinate Yt. For example, the correction value Yerror may be calculated as Yerror=m*(Xs−Xc)+Xerror, and the corrected y-coordinate Yc may be calculated as Yc=Yt+Yerror, where the gradient m may be substituted by the gradient m_i of step 120, the ripple value Xserror may be substituted by the ripple value Xserror_i of step 120, and the coordinate Xs and the corrected x-coordinate Xc are respectively obtained in steps 116 and 118. By combining the corrected y-coordinate Yc of step 124 and the corrected x-coordinate Xc of step 118, the complete corrected coordinates (Xc, Yc) are obtained. The corrected coordinates (Xc, Yc) are closer to the real coordinates of the touch control position, and may thus replace the original coordinates (Xt, Yt).

In step 126, when the advanced sensing value capsum is smaller than the lower limit sensing value capsum_min, step 128 is performed, or else step 130 is performed.

In step 128, the original coordinates (Xt, Yt) are eliminated. That is, the corresponding touch control operation is determined as invalid.

From steps 102 to 128, the process 100 is capable of providing the corrected coordinates (Xc, Yc) for representing the touch control position for the original coordinates (Xt, Yt), or determining a touch event that initiates the process 100 as an invalid touch control operation (step 128). When the process 100 is performed from step 106 to step 126, it means that the original x-coordinate Xt is located at the central region (referring to step 106) of the sensing region 18, and so no correction is required.

In step 130, the process 100 ends.

Figure 11:
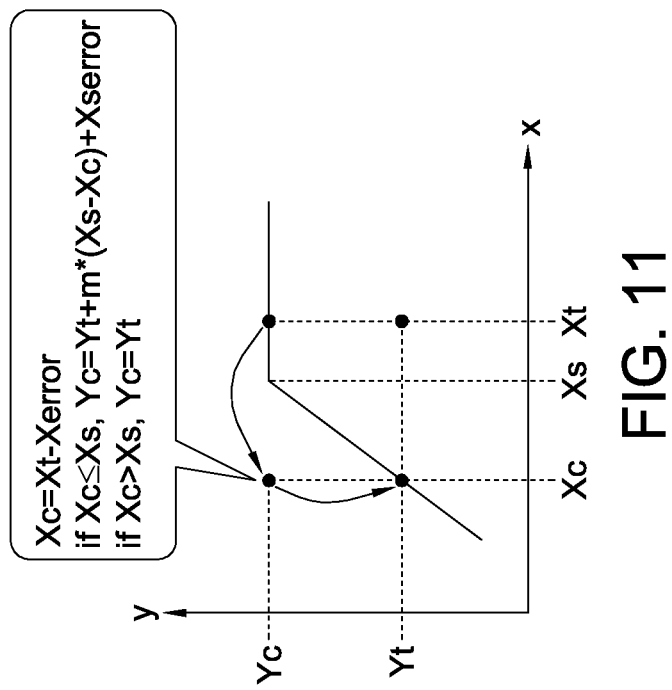

FIG. 11 shows diagram of coordinates when performing steps 118, 122 and 124. If the original coordinates (Xt, Yt) need to be corrected into the corrected coordinates (Xc, Yc), the process 100 first corrects the x-coordinate. More specifically, the corrected x-coordinate Xc is first obtained according to the original x-coordinate Xt and the correction value Xerror (step 116). According to the principles in FIG. 5, the original y-coordinate Yt is then corrected. When the corrected x-coordinate Xc is inside the coordinate Xs (step 116), no further correction is required. Conversely, when the corrected x-coordinate Xc is outside the coordinate Xs as shown in FIG. 11, the original y-coordinate Yt is corrected according to the linear model of the gradient m and the ripple value Xserror, such that the corrected y-coordinate Yc=Yt+m*(Xs−Xc)+Xserror. The gradient m and the ripple value Xserror are provided by steps 116 and 120, respectively.

Figure 12:
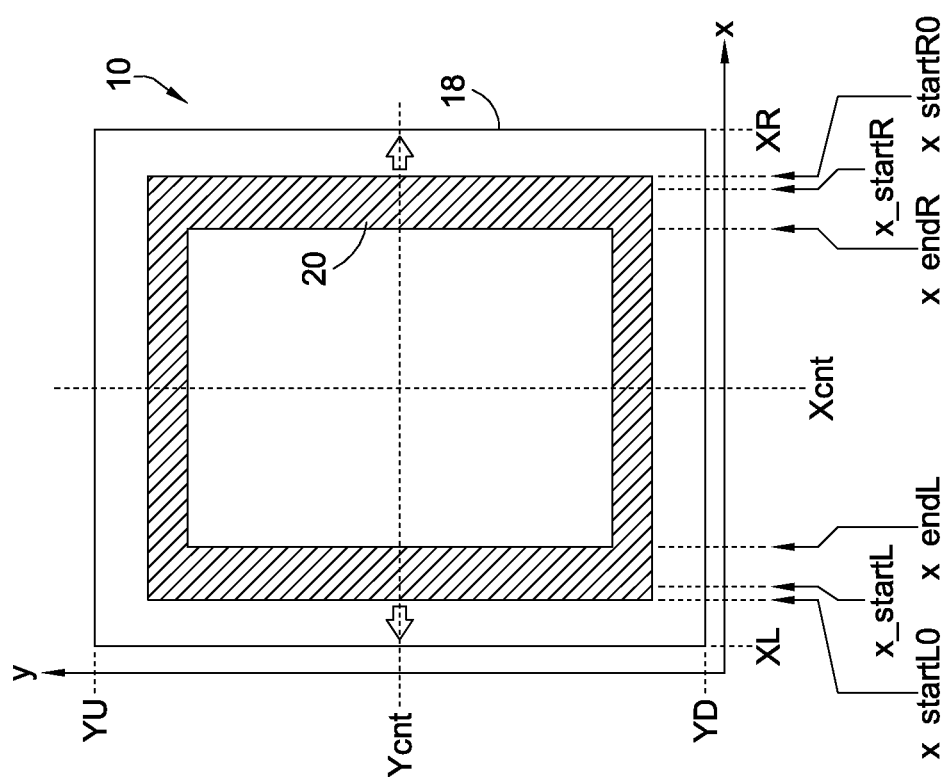
FIG. 12 shows a region extension operation according to an embodiment.

Between steps 128 and 130, the process 100 may further comprise an optional step 129, which is a region extension step. FIG. 12 shows a schematic diagram of region extension according to an embodiment of the present invention. As previously described in association with FIG. 7, the coordinates x_startL, x_startR, x_endL and x_endR are defined in the sensing region 18 of the touch panel 10. When the original x-coordinate Xt is between the coordinates x_startL and x_endL (or between the coordinates x_startR and x_endR), the process 100 is able to perform step 116 from step 114 to correct the original coordinates (Xt, Yt). After obtaining the corrected coordinates (Xc, Yc), the corrected coordinates (Xc, Yc) are located within a certain distribution range, i.e., a shaded region 20 in FIG. 12. X-axis upper and lower limits of the region 20 may be regarded as x-axis detectable outer-edge coordinates, i.e., coordinates x_startL0 and x_startR0 in FIG. 12. That is to say, the corrected x-coordinate Xc is between the coordinates x_startL0 and x_endL (or between the coordinates x_startR0 and x_endR). The purpose of the region extension step is to associate the coordinate x_startL0 to the left side (i.e., the position at the x-coordinate XL) of the sensing region 18, and to associate the coordinate x_startR0 to the right side (i.e. the position at the x-coordinate RL) of the sensing region 18. More specifically, when the corrected x-coordinate Xc provided by the process 100 is equal to the coordinate x_startL0, the touch control position shall be regarded as at the left side of the sensing region after the adjustment by the region extension step. When the corrected x-coordinate Xc provided by the process 100 is between the coordinates x_startL0 and x_endR, the touch control position will be adjusted to between the coordinates x_startL0 and the corrected x-coordinate Xc after the region extension step. When the corrected x-coordinate Xc is between the coordinates x_endL and x_endR, the touch control position is not further adjusted by the region extension step. After the region extension step, the adjusted touch control position shall fully occupy the entire sensing region 18.

Figure 13:
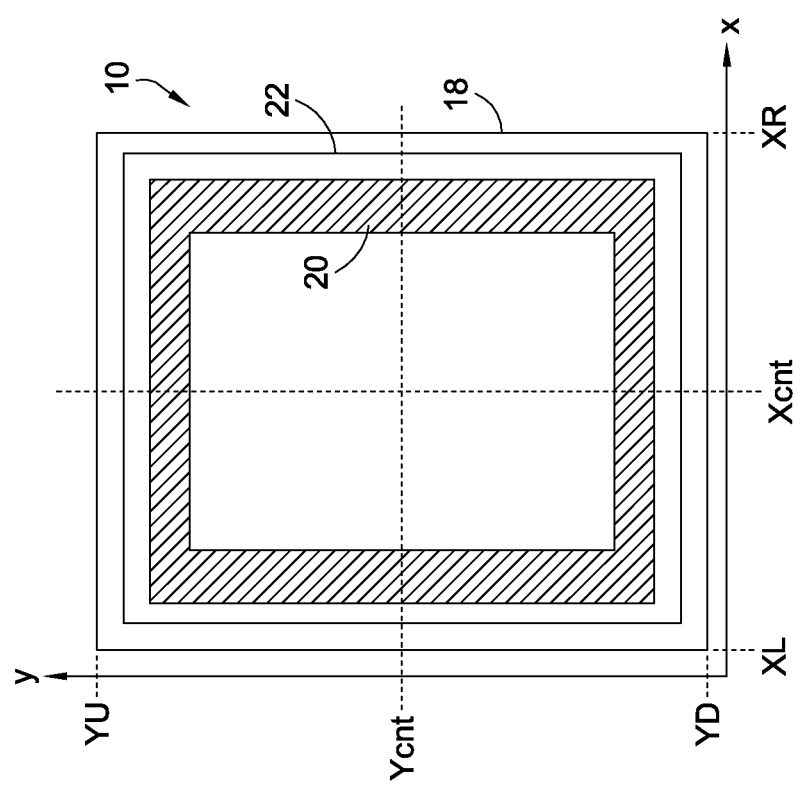
FIG. 13 shows a region scaling operation according to an embodiment.

In step 129 of the process 100, a region scaling step may further be performed after the region extension step. FIG. 13 shows a schematic diagram of region scaling according to an embodiment of the present invention. The touch panel 10 may comprise a display panel (e.g., the stack layer L5 in FIG. 2) for displaying a display image in a display region. In one embodiment, the display region may be a region 22 in FIG. 13, and is smaller than the sensing region 18. Alternatively, the display region may also be greater than the sensing region 18. In the region scaling step, upper, lower, left and right corners of the sensing region are associated to upper, lower, left and right sides of the display region, respectively, such that the touch control position originally distributed in the sensing region 18 may be uniformly scaled to fully occupy the display region. For example, after the process 100 and the region extension step, if the touch control position is at the left side of the sensing region 18, the region scaling step further renders the touch control position to be regarded as at the left side of the display region. When the display region is smaller than the sensing region 18, after the adjustment by the region scaling step, a distance between the adjusted touch control position and coordinates (Xcnt, Ycnt) shall become shorter than a distance between the touch control position before the adjustment and the coordinates (Xcnt, Ycnt). The region extension and/or region adjustment may be regarded as a part of correction operations on the x-coordinate and/or the y-coordinate.

Figure 14:
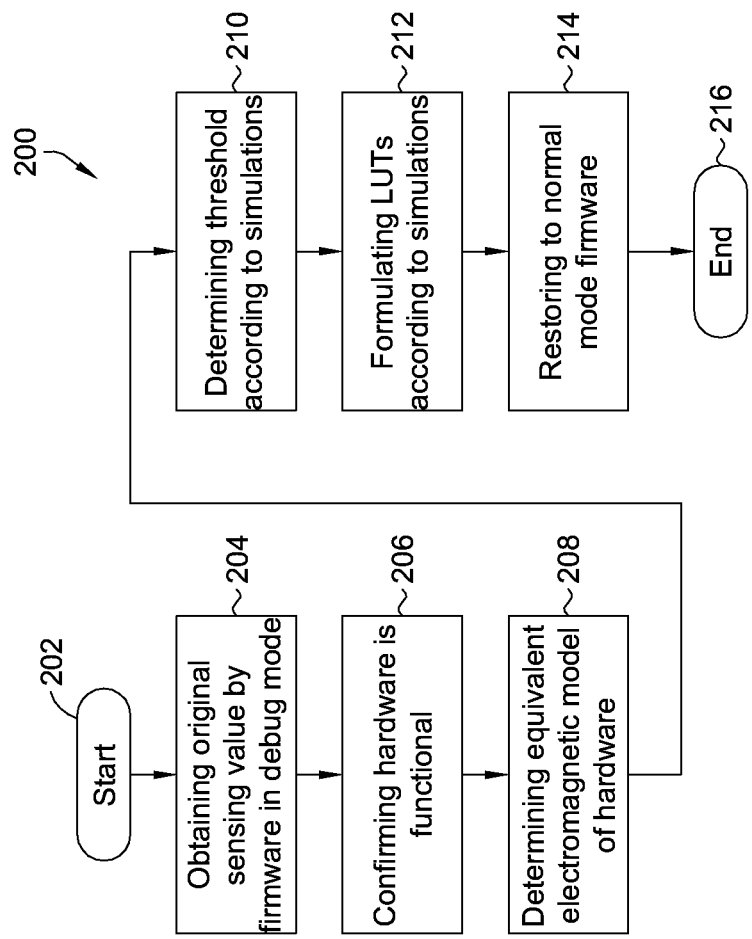
FIG. 14 shows a flowchart of a method for providing associated parameters and LUTs for the flowchart in FIG. 6 according to an embodiment of the present invention.

FIG. 14 shows a process 200 according to an embodiment of the present invention. The process 200 generates various parameters required by the process 100, and provides the LUTs 30, 40 and 50 (FIGS. 8 to 10). Main steps of the process 200 are described below.

The process 200 begins with step 202. For example, when a touch panel (or a device equipped with a touch panel) of a particular model number implements the process 100, the process 200 can be performed by hardware of the touch panel or the device of the model number.

In step 204, firmware of a debug mode is generated for the hardware, such that the hardware is capable of outputting sensing values of sensing electrodes when the hardware executes the firmware of the debug mode.

In step 206, it is confirmed whether the hardware is functional. For example, bonding and pads associated with the sensing electrodes are checked to verify whether shapes, geometric arrangements and connections of the bonding and pads are correct.

In step 208, an equivalent electromagnetic model of the hardware is determined, e.g., the dielectric constant eps and the distance Dst, required by the equation eq1e in FIG. 2 and both associated with hardware characteristics, are determined. For example, the distance Dst is determined with reference to a distance Da between the stack layers L1 to L3 and also with appropriate reference to influences of the stack layer L5. The value of the dielectric coefficient eps may be determined with reference to thicknesses of the stack layers L1 to L3 and dielectric coefficients of the stack layers. After determining the equivalent electromagnetic model, an expected sensing value triggered by a predetermined touch control event can be simulated and calculated through electromagnetic values, and the obtained sensing value is then compared with a sensing value actually measured by the hardware. If the two sensing values match (with a difference between the two sensing values falls within an acceptable tolerable range), it means that the equivalent electromagnetic model is capable of effectively simulating behaviors of the hardware. If the difference between the simulated sensing value and the actual sensing value is too large, the equivalent electromagnetic model may be adjusted (e.g., by changing the value of the distance Dst) until the simulated sensing value of the equivalent electromagnetic model matches the actual sensing value.

In step 210, simulations are carried out by use of the equivalent electromagnetic model of step 208 to set various parameters and thresholds for the process 100, e.g., the sensing value upper and lower limits of the touch control elimination rules, and/or the sensing value capsum_min of step 114 and 116.

In step 212, electromagnetic values are simulated by use of the electromagnetic model of step 208 to simulate the original coordinates (Xt, Yt) calculated by the hardware with the known touch control size d and real coordinates (X0, Y0) of the touch control position, and a curve-fitting operation is accordingly performed for the curves in FIGS. 4 and 5. According to the curves, the LUTs for the process 100 can be formulated, e.g., the LUTs 20, 30 and 40 required in steps 116 and 120 are obtained.

In step 214, firmware of a normal mode is generated for the hardware, and the process 100 is integrated into the firmware, so that the hardware is capable of correcting the coordinates of the touch control position according to the process 100 when the normal mode firmware is executed by the hardware.

The process 200 ends in step 216. The process 200 is repeated for or a touch panel (device) of a different model so that the process 100 can be extensively applied to touch panels (devices) of different module numbers.

Figure 15:
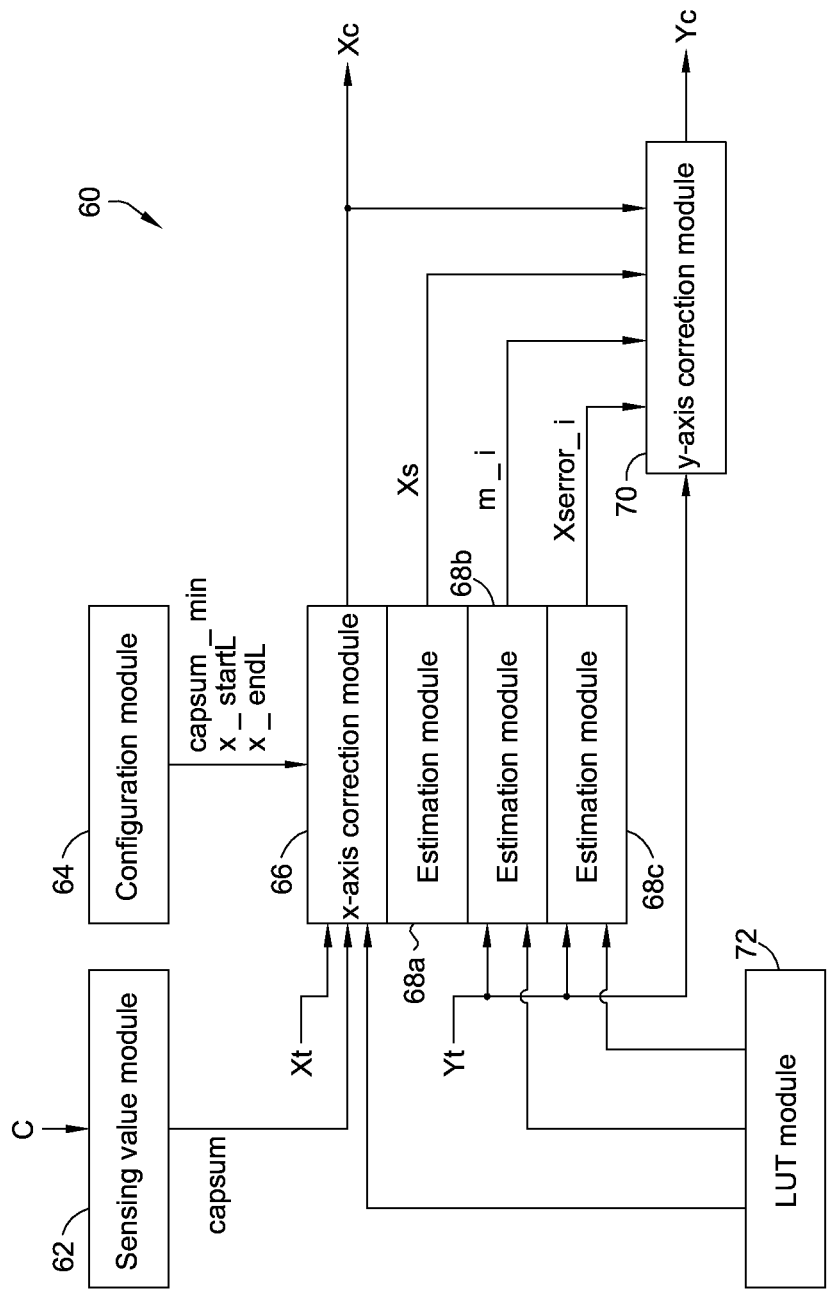
FIG. 15 shows a system for correcting original coordinates preliminarily calculated by a touch panel according to an embodiment of the present invention.

FIG. 15 shows a system 60 for coordinate correction for a touch panel according to an embodiment of the present invention. The system 60 is for correcting original coordinates (Xt, Yt) provided by a touch panel 10 (FIG. 1) according to the process 100. The correction system 60 comprises a configuration module 64, a sensing value module 62, an x-axis correction module 66, a y-axis correction module 70, estimation modules 68a, 68b and 68c, and an LUT module 72. The configuration module 72 provides a sensing value capsum_min as well as thresholds and parameters such as coordinates x_startL and x_endL. The sensing value module 62 provides an advanced sensing value capsum according to a total sensing value C of the touch panel 10. When the original x-coordinate Xt is between the coordinates x_startL and x_endL, and the advanced sensing value capsum is greater than the sensing value capsum_min, the x-axis correction module 66 provides a corrected x-coordinate Xc (referring to FIG. 8 and step 116) according to the original x-coordinate Xt, the sensing value capsum and an LUT 30, the estimation module 68a provides a coordinate Xs, the estimation module 68b provides an estimated gradient m_i (referring to FIG. 9 and step 116) according to an LUT 40, and the estimation module 68c provides a ripple value Xserror_i according to an LUT 50 (referring to FIG. 10 and step 120). When the corrected x-coordinate Xc is outside the coordinate Xs, the y-axis correction module 70 further provides a corrected y-coordinate Yc according to the original x-coordinate Xt, the coordinate Xs, the estimated gradient m_i and the estimated ripple value Xserror_i (referring to FIG. 11 and steps 122 and 124). The LUT module 72 provides the LUTs 30, 40 and 50. The modules in the system 60 may be implemented by hardware, software or firmware.

In conclusion, according to a sensing value sensed by a touch panel and original coordinates preliminarily calculated by the touch panel, the present invention corrects the original coordinates that are located at a border of a sensing region and have a greater error, thereby enhancing precision and accuracy of a touch control position analyzed by the touch panel. In the present invention, the original x-coordinate may first be corrected, and it is then determined whether to correct the original y-coordinate according to the corrected x-coordinate. The present invention is applicable to single-finger touch panel made of single-layer sensing electrodes, so as to offer accurate touch sensing to such type of low-cost panels. Further, by performing the correction through LUTs and interpolation, the present invention provides good balance between memory resource requirements and computation resource requirements.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for coordinate correction of touch control, applied to a touch panel, the touch panel providing an original x-coordinate, an original y-coordinate and a total sensing value through touch sensing; the method for correcting the original x-coordinate and the original y-coordinate, comprising:
providing an estimated x-axis correction value according to the original x-coordinate and the total sensing value;
performing or not performing an x-axis correction according to a size of the total sensing value and whether the original x-coordinate is located in an x-axis border range to generate a corrected x-coordinate, for correcting the original x-coordinate, according to the original x-coordinate and the estimated x-axis correction value;
providing an advanced sensing value according to the total sensing value;
providing an x-axis correction table for recording a plurality of x-axis correction values for a plurality of look-up table (LUT) sensing values and a plurality of LUT x-coordinates, wherein each of the x-coordinates is associated with one of the LUT sensing values and one of the LUT x-coordinates;
looking up a first LUT x-coordinate and a second LUT x-coordinate from the LUT x-coordinates, such that the original x-coordinate is between the first LUT x-coordinate and the second LUT x-coordinate;

looking up a first LUT sensing value and a second LUT sensing value from the LUT sensing values, such that the advanced sensing value is between the first LUT sensing value and the second LUT sensing value;

providing a first x-axis correction value, a second x-axis correction value, a third x-axis correction value and a fourth x-axis correction value, such that the first x-axis correction value is associated with the first LUT sensing value and the first LUT x-coordinate, the second x-axis correction value is associated with the first LUT sensing value and the second LUT x-coordinate, the third x-axis correction value is associated with the second LUT sensing value and the first LUT x-coordinate, and the fourth x-axis correction value is associated with the second LUT sensing value and the second LUT x-coordinate;

interpolating the first x-axis correction value and the second x-axis correction value according to the first LUT x-coordinate, the second LUT x-coordinate and the original x-coordinate to obtain a first interpolation x-axis correction value;

interpolating the third x-axis correction value and the fourth x-axis correction value according to the first LUT x-coordinate, the second LUT x-coordinate and the original x-coordinate to obtain a second interpolation x-axis correction value;

interpolating the first interpolation x-axis correction value and the second interpolation x-axis correction value according to the first LUT sensing value, the second LUT sensing value and the advanced sensing value to obtain the estimated x-axis correction value;

wherein the LUT sensing values are associated with a plurality of LUT touch control sizes, respectively; the method further comprising:

providing a first LUT touch control size and a second LUT touch control size, associated with the first LUT sensing value and the second LUT sensing value, respectively, from the LUT touch control sizes;

interpolating the first LUT touch control size and the second LUT touch control size according to the first LUT sensing value, the second LUT sensing value and the advanced sensing value to obtain an estimated touch control size;

providing an x-axis correction starting coordinate according to the estimated touch control size;

providing an estimated y-axis correction value and performing a y-coordinate correction when the corrected x-coordinate is located outside the x-axis correction starting coordinate;

wherein, the y-coordinate correction comprise providing a corrected y-coordinate, for correcting the original y-coordinate, according to the original y-coordinate and the estimated y-axis correction value;

wherein the LUT touch control sizes are further associated with a plurality of sets of gradient value curve parameters, respectively, each set of gradient value curve parameters is associated with a curve, and each curve is for associating the original y-coordinate to a gradient the method further comprising:

providing a first set of gradient value curve parameters and a second set of gradient value curve parameters, associated with the first LUT touch control size and the second LUT touch control size, respectively, from the sets of gradient value curve parameters;

substituting the original y-coordinate into the curve associated with the first set of gradient value curve parameters to obtain a first gradient;

substituting the original y-coordinate into the curve associated with the second set of gradient value curve parameters to obtain a second gradient;

interpolating the first gradient and the second gradient according to the first LUT touch control size, the second LUT touch control size and the estimated touch control size to obtain an estimated gradient; and providing the estimated y-axis correction value according to the corrected x-coordinate and the estimated gradient.

2. The method according to claim 1, further comprising:
providing an x-axis border inner-edge coordinate and an x-axis border outer-edge coordinate to define the x-axis border range;
providing an advanced sensing value according to the total sensing value; and
providing a lower limit sensing value;
wherein, the step of selectively performing the x-coordinate correction selects whether to perform the x-coordinate correction according to whether the total sensing value is greater than the lower limit and whether the original x-coordinate is located in the x-axis border range.

3. The method according to claim 1, further comprising:
providing an estimated y-axis correction value according to the original x-coordinate, the total sensing value and the corrected x-axis coordinate;
providing an x-axis correction starting coordinate according to the original x-coordinate and the total sensing value; and
selective performing a y-axis coordinate correction according to whether the corrected x-coordinate is located outside the x-axis correction starting coordinate to provide a corrected y-coordinate, for correcting the original y-coordinate, according to the original y-coordinate and the estimated y-axis correction value.

4. The method according to claim 3, further comprising:
providing an advanced sensing value according to the total sensing value;
providing a lower limit sensing value;
when the original x-coordinate is located within the x-axis border range and the advanced sensing value is greater than the lower limit sensing value, providing an estimated gradient and an estimated ripple value according to the original x-coordinate, the advanced sensing value and the original y-coordinate; and
providing the y-axis correction value according to the original x-coordinate, the x-axis correction starting coordinate, the estimated gradient and the estimated ripple value.

5. The method according to claim 1, further comprising:
providing a y-axis compensation boundary; and
compensating the total sensing value when the original y-coordinate is located outside the y-axis compensation boundary.

6. The method according to claim 1, wherein the touch panel comprises a plurality of sensing electrode groups formed on a same conductive layer and arranged from one side to one other side of a sensing region; each of the sensing electrode groups comprises a plurality of sensing electrodes, each of which extends along a y-axis from the one side of the sensing region to the other side of the sensing region; the total sensing value represents self-coupling capacitance changes sensed by the sensing electrode groups.

7. The method according to claim 6, wherein the x-coordinate correction further comprises:

providing an x-axis border inner-edge coordinate and an x-axis outer-edge coordinate to define the x-axis border range; rendering the corrected x-axis coordinate to be between the x-axis border outer-edge coordinate and the x-axis border inner-edge coordinate, and the x-axis detectable outer-edge coordinate to be between the x-axis border outer-edge coordinate and the side of the sensing region; and performing a region extension to associate the x-axis detectable outer-edge coordinate to the side of the sensing region.

8. The method according to claim 7, wherein the touch panel further comprises a display panel for displaying a display image in a display region; the method further comprises a region scaling step to associate the side of the sensing region to a side of the display region.

9. The method according to claim 1, wherein the LUT touch control sizes are further associated with a plurality of sets of ripple value curve parameters, respectively, each set of ripple value curve parameters is associated with a curve, and each curve is for associating the original y-coordinate to a ripple value; the method further comprising:

providing a first set of ripple value curve parameters and a second set of ripple value curve parameters, associated with the first LUT touch control size and the second LUT touch control size, respectively, from the sets of ripple value curve parameters;

substituting the original y-coordinate into the curve associated with the first set of ripple value curve parameters to obtain a first ripple value;

substituting the original y-coordinate into the curve associated with the second set of ripple value curve parameters to obtain a second ripple value;

interpolating the first ripple value and the second ripple value according to the first LUT touch control size, the second LUT touch control size and the estimated touch control size to obtain an estimated ripple value;

providing the estimated y-axis correction value according to the corrected x-coordinate and the estimated ripple value; and when the corrected x-coordinate is located outside the x-axis correction starting coordinate, providing the estimated y-axis correction value according to the corrected x-coordinate, the estimated gradient and the estimated ripple value.

10. A system for coordinate correction of touch control, applied to a touch panel, the touch panel providing an original x-coordinate, an original y-coordinate and a total sensing value through touch sensing; the system for correcting the original x-coordinate and the original y-coordinate, comprising:

a configuration module, for providing a lower limit sensing value, an x-axis border inner-edge coordinate and an x-axis border outer-edge coordinate;

a sensing value module, for providing an advanced sensing value according to the total sensing value;

an x-axis correction module;

a y-axis correction module;

wherein, only when the original x-coordinate is between the x-axis border inner-edge coordinate and the x-axis border outer-edge coordinate, and the advanced sensing value is greater than the lower limit sensing value, the x-axis correction module provides a corrected x-coordinate, for correcting the original x-axis, according to the original x-coordinate and the advanced sensing value; and the y-axis correction module provides a corrected y-coordinate, for correcting the original y-coordinate, according to the original x-coordinate, the corrected x-coordinate and the advanced sensing value;

a first estimation module, for providing an x-axis correction starting coordinate according to the original x-coordinate and the advanced sensing value;

wherein, when the corrected x-coordinate is located outside the x-axis correction starting coordinate, the y-axis correction module further provides an estimated y-axis correction value, and provides the corrected y-coordinate according to the original y-coordinate and the estimated y-axis correction value;

a second estimation module, for providing an estimated gradient according to the original x-coordinate, the advanced sensing value and the original y-coordinate;

a third estimation module, for providing an estimated ripple value according to the original x-coordinate, the advanced sensing value and the original y-coordinate;

wherein, the y-axis correction module generates the estimated y-axis correction value according to the original x-coordinate, the x-axis correction starting coordinate, the estimated gradient and the estimated ripple value;

an LUT module, for providing an x-axis correction table for recording a plurality of x-axis correction values for a plurality of LUT sensing values and a plurality of LUT x-coordinates, wherein each of the x-axis correction values is associated with one of the LUT sensing values and one of the LUT x-coordinates;

wherein, the x-axis correction module looks up a first LUT x-coordinate and a second LUT x-coordinate from the LUT x-coordinates according to the original x-axis; looks up a first LUT sensing value and a second LUT sensing value from the LUT sensing values according to the advanced sensing value; provides a plurality of x-axis correction values according to the x-axis correction table, such that each of the x-axis correction value is associated with one of the first LUT sensing value and the second LUT sensing value, and is associated with one of the first x-axis correction value and the second x-axis correction value; interpolates the x-axis correction values according to the first LUT x-coordinate, the second LUT x-coordinate, the original x-coordinate, the first LUT sensing value, the second LUT sensing value and the advanced sensing value to obtain an estimated x-axis correction value; and provides the corrected x-coordinate according to a linearity combination of the original x-coordinate and the estimated x-axis correction value, wherein the LUT sensing values are associated with a plurality of LUT touch control sizes, respectively; the x-axis correction module provides a first LUT touch control size and a second LUT touch control size, associated with the first LUT sensing value and the second LUT sensing value, respectively, from the LUT touch control sizes; the x-axis correction module interpolates the first LUT touch control size and the second LUT touch control size to obtain an estimated touch control size; and the first estimation module provides the x-axis correction starting coordinate according to the estimated touch control size, and wherein the LUT module further provides a plurality of sets of gradient value curve parameters; each set of gradient value curve parameters is associated with a first curve, and each first curve associates the original y-coordinate to a gradient the x-axis correction module further provides a first set of gradient value curve parameters and a second set of gradient value curve parameters, associated with the first LUT touch control size and the second LUT touch control size, respectively, from the sets of gradient value curve parameters; the second estimation module substitutes the original y-coordinate into the first curve associated with the first set of gradient value curve parameters to obtain a first gradient, substitutes the original y-coordinate into the first curve associated with the second set of gradient value curve parameters to obtain a second gradient, and interpolates the first gradient and the second gradient to obtain an estimated gradient.

11. The system according to claim 10, wherein the LUT module further provides a plurality of sets of ripple value curve parameters; each set of ripple value curve parameters is associated with a second curve, and each second curve associates the original y-coordinate to a ripple value; the third estimation module substitutes the original y-coordinate into the second curve associated with the first set of ripple value curve parameters to obtain a first ripple value, substitutes the original y-coordinate into the second curve associated with the second set of ripple value curve parameters to obtain a second ripple value, and interpolates the first ripple value and the second ripple value to obtain the estimated ripple value.

* * * * *